United States Patent
Prenzel et al.

(10) Patent No.: US 9,896,521 B2
(45) Date of Patent: *Feb. 20, 2018

(54) CROSSLINKER-ACCELERATOR SYSTEM FOR POLYACRYLATES

(71) Applicant: tesa SE, Hamburg (DE)

(72) Inventors: Alexander Prenzel, Hamburg (DE);
Sarah Bamberg, Hamburg (DE);
Jennifer Beschmann, Hamburg (DE);
Marten Papenbroock, Hamburg (DE)

(73) Assignee: tesa SE, Norderstedt (DE)

(*) Notice: Subject to any disclaimer, the term of this patent is extended or adjusted under 35 U.S.C. 154(b) by 670 days.

This patent is subject to a terminal disclaimer.

(21) Appl. No.: 13/736,476

(22) Filed: Jan. 8, 2013

(65) Prior Publication Data
US 2013/0190459 A1    Jul. 25, 2013

(30) Foreign Application Priority Data

Jan. 20, 2012 (DE) .................. 10 2012 200 853

(51) Int. Cl.
*C08G 18/28* (2006.01)
*C08G 18/42* (2006.01)
(Continued)

(52) U.S. Cl.
CPC ............. *C08F 20/10* (2013.01); *C09J 133/00* (2013.01); *C08K 5/1515* (2013.01); *C08K 5/17* (2013.01)

(58) Field of Classification Search
USPC ....................................... 525/330.5
See application file for complete search history.

(56) References Cited

U.S. PATENT DOCUMENTS

| 4,524,104 A | 6/1985 | Hagio et al. |
| 5,484,850 A * | 1/1996 | Kempter .................. C08F 8/00 525/286 |

(Continued)

FOREIGN PATENT DOCUMENTS

| CN | 1294761 A | 5/2001 |
| CN | 1 576 291 A | 2/2005 |

(Continued)

OTHER PUBLICATIONS

Fikentscher Polymer Aug. 1967, 381ff.

(Continued)

*Primary Examiner* — Ling Choi
*Assistant Examiner* — Thuy-Ai N Nguyen
(74) *Attorney, Agent, or Firm* — Norris McLaughlin & Marcus, P.A.

(57) ABSTRACT

Crosslinker-accelerator system for the thermal crosslinking of polyacrylates having functional groups capable of entering into linking reactions with epoxide groups, comprising at least one substance having at least one epoxide group as crosslinker and at least one substance of the formula $$R^1{}_2N\text{—}CR^2R^3\text{—}CR^4R^5\text{—}(CR^6R^7)_n\text{—}X$$

Figure 1:
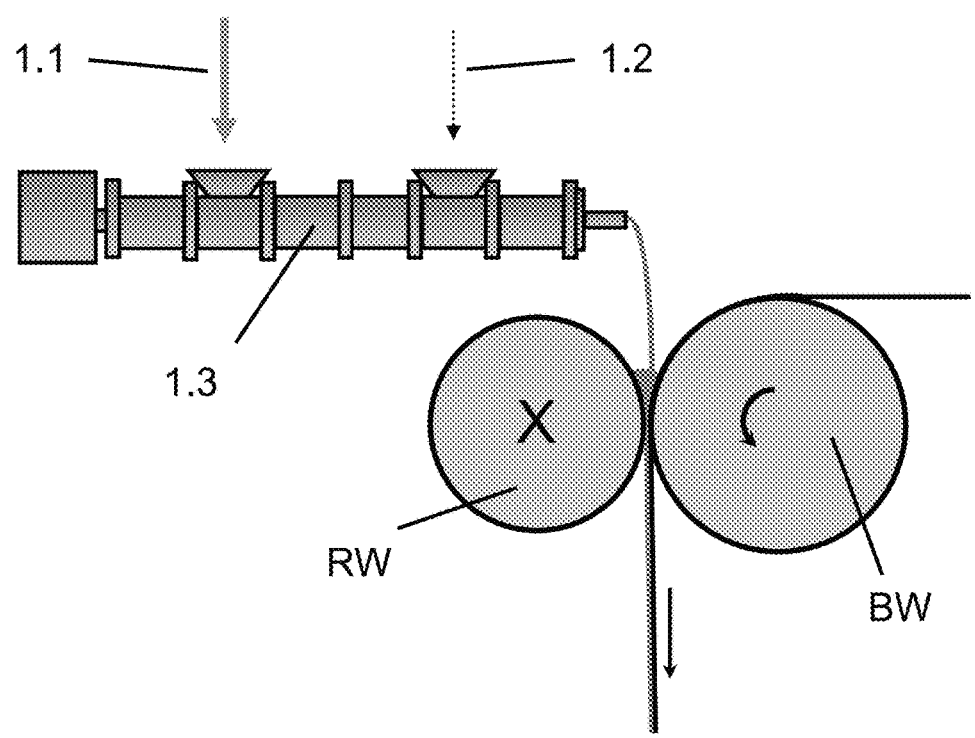

in which the $R^1$ independently represent hydrogen, a substituted or unsubstituted alkyl or cycloalkyl radical or together with the nitrogen atom form a 5-7-membered ring; $R^2$, $R^3$, $R^4$, $R^5$, $R^6$ and $R^7$ independently represent hydrogen or an alkyl radical having 1 to 8 carbon atoms or form a 5-7-membered cycloalkylene group;
n is an integer from 0 to 4; and
X represents —OH, —OR, —SH, —SR and —PR$_2$, in which R independently represents $C_1$-$C_{18}$ alkyl radical, (Continued)

$C_2$-$C_{18}$ alkenyl radical or $C_2$-$C_{18}$ alkynyl radical, an aryl group or an aliphatic or aromatic heterocycle, as accelerator.

10 Claims, 4 Drawing Sheets

(51) Int. Cl.
    *C08G 18/16*     (2006.01)
    *C08G 18/18*     (2006.01)
    *C08G 18/62*     (2006.01)
    *C08F 20/10*     (2006.01)
    *C09J 133/00*     (2006.01)
    *C08K 5/1515*     (2006.01)
    *C08K 5/17*     (2006.01)

(56) References Cited

U.S. PATENT DOCUMENTS

| | | |
|---|---|---|
| 5,789,487 A | 8/1998 | Matyjaszewski et al. |
| 5,854,364 A | 12/1998 | Senninger et al. |
| 5,877,261 A | 3/1999 | Harder et al. |
| 5,945,491 A | 8/1999 | Matyjaszewski et al. |
| 6,495,653 B1 | 12/2002 | Kinsho |
| 6,720,399 B2 | 4/2004 | Husemann et al. |
| 6,765,078 B2 | 7/2004 | Husemann et al. |
| 7,329,717 B2 | 2/2008 | Laas et al. |
| 2004/0092685 A1 | 5/2004 | Husemann et al. |
| 2005/0004320 A1 | 1/2005 | Laas et al. |
| 2009/0048398 A1 | 2/2009 | Zollner et al. |
| 2010/0104864 A1 | 4/2010 | Zöllner et al. |
| 2011/0165402 A1 | 7/2011 | Zollner et al. |

FOREIGN PATENT DOCUMENTS

| | | |
|---|---|---|
| DE | 10 2004 044 086 A1 | 3/2006 |
| EP | 0 752 435 A2 | 1/1997 |
| EP | 1 311 555 B1 | 3/2005 |
| EP | 1 978 069 A1 | 10/2008 |
| WO | 2006/027387 A1 | 3/2006 |

OTHER PUBLICATIONS

Fox equation (cf. T.G. Fox, Bull. Am. Phys. Soc. 1956, 1, 123).
German Search Report dated Jul. 26, 2007.
English Translation of Taiwanese Office Action dated Apr. 19, 2016 for corresponding Taiwanese Application No. 101150485.
Chinese Office Action corresponds to Chinese Application No. 21310020997.2, dated Mar. 10, 2017.

* cited by examiner

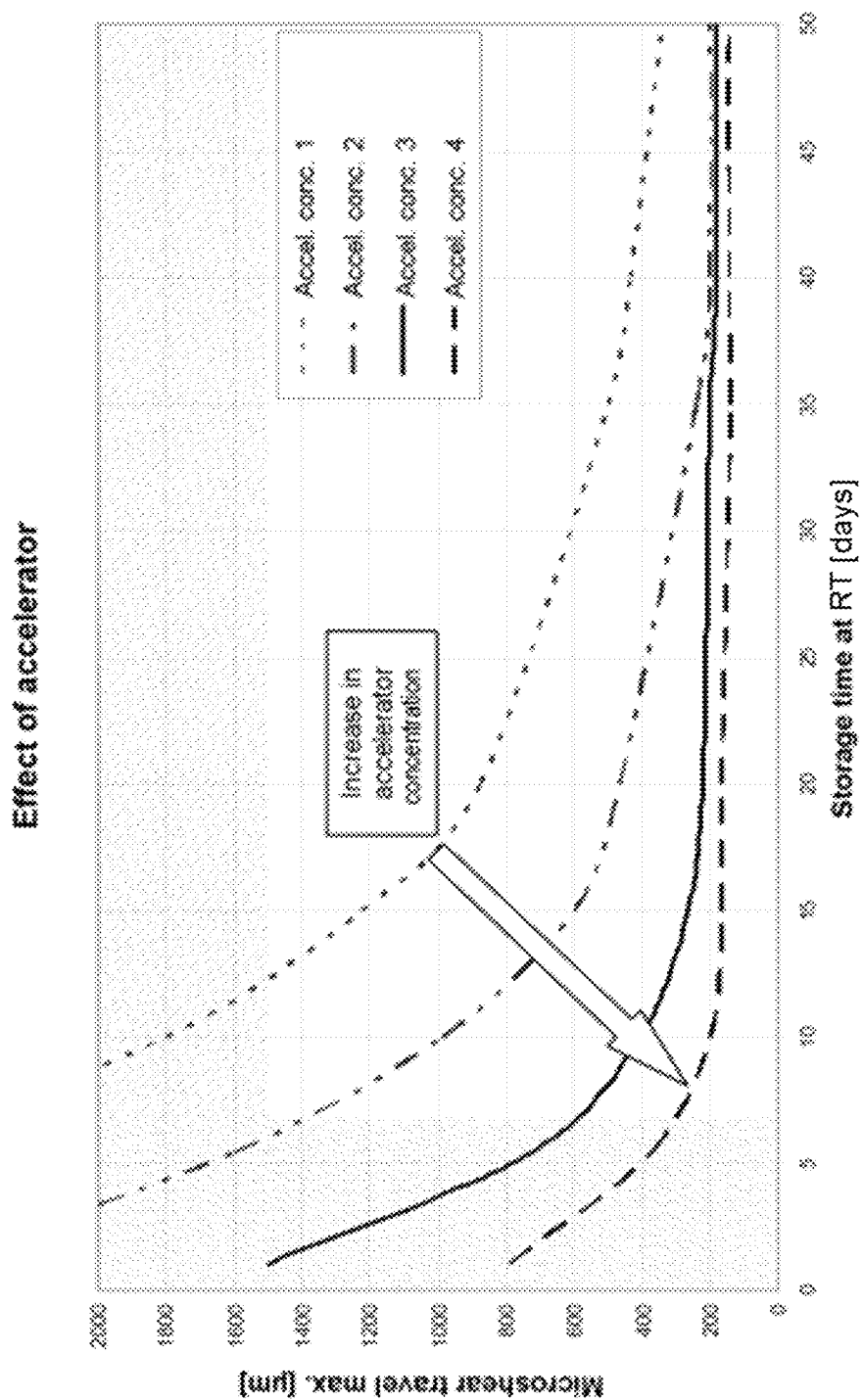

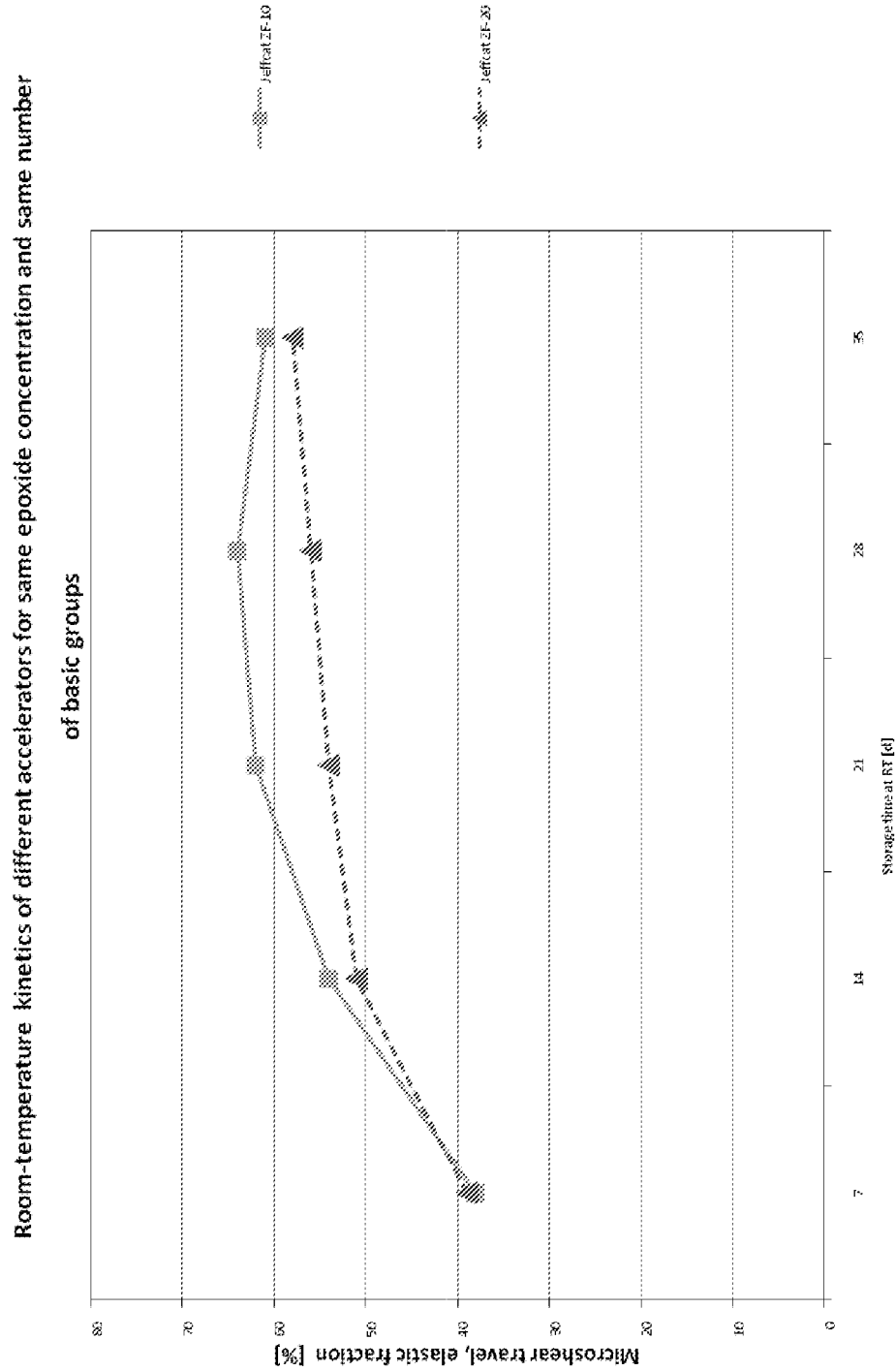

CROSSLINKER-ACCELERATOR SYSTEM FOR POLYACRYLATES

The present invention relates to the technical field of crosslinkable polyacrylates. In particular a system is proposed for controlling the crosslinking rate of thermally crosslinkable polyacrylates, this system being based on the combination of a substance containing epoxide groups with a specifically substituted amine.

BACKGROUND OF THE INVENTION

Polyacrylates are widely used for high-grade industrial applications, as adhesives, more particularly as pressure-sensitive adhesives or heat-sealing adhesives, having proved to be highly suitable for the growing requirements in these areas of application. For instance, pressure-sensitive adhesives (PSAs) are required to have a good initial tack, but also to meet exacting requirements in terms of shear strength. At the same time these compositions must be suitable for coating onto carrier materials. All of this can be achieved through the use of polyacrylates with a high molecular weight and high polarity, and their efficient crosslinking. Moreover, polyacrylates can be produced to be transparent and stable to weathering.

For the coating of polyacrylate compositions useful as PSA from solution or as a dispersion, thermal crosslinking has long been state of the art. In general, the thermal crosslinker—for example a polyfunctional isocyanate, a metal chelate or a polyfunctional epoxide—is added to the solution or dispersion of a polyacrylate equipped with corresponding functional groups, the resulting composition is coated as a sheetlike film onto a substrate, and the coating is subsequently dried. Through this procedure, organic solvents, or water in the case of dispersions, are evaporated, and the polyacrylate, accordingly, is crosslinked. Crosslinking is very important for the coatings, since it gives them sufficient cohesion and thermal shear strength. Without crosslinking, the coatings would be too soft and would flow away under even a low load. Critical to a good coating outcome is the observance of the potlife (processing life, within which the system is in a processable state), which can vary greatly according to crosslinking system. If this life is too short, the crosslinker has already undergone reaction in the polyacrylate solution; the solution is already partly crosslinked and can no longer be applied uniformly.

The technological operation for producing PSAs is in a state of continual onward development. Motivated by more restrictive environmental impositions and by rising prices for solvents, an aim is to eliminate the solvents as far as possible from the manufacturing operation. Within the industry, therefore, there is continual growth in the importance of melt processes (also referred to as hotmelt processes) with solvent-free coating technology for the production of PSAs. In such processes, meltable polymer compositions, i.e. polymer compositions which at elevated temperatures enter into the fluid state without decomposing, are processed. Such compositions can be processed outstandingly from the melt state. In ongoing developments of this procedure, an aim is to make the production of the product compositions as well a low-solvent or solvent-free operation.

The introduction of the hotmelt technology is imposing growing requirements on the adhesives. Meltable polyacrylate compositions in particular (synonymous designations: "polyacrylate hotmelts", "acrylate hotmelts") are being investigated very intensively for improvements. In the coating of polyacrylate compositions from the melt, thermal crosslinking has to date not been very widespread, in spite of the potential advantages of this method.

Acrylate hotmelts have to date been crosslinked primarily through radiation-chemical methods (UV irradiation, EBC irradiation). This procedure, however, is associated with a variety of disadvantages:

In the case of crosslinking by means of UV rays, only UV-transparent (UV-pervious) layers can be crosslinked.

In the case of crosslinking with electron beams (electron beam crosslinking or electron beam curing, also EBC), the electron beams possess only a limited depth of penetration, which is dependent on the density of the irradiated material and on the accelerator voltage.

In both of the aforementioned methods, the layers after crosslinking have a crosslinking profile, and the pressure-sensitive adhesive layer does not crosslink homogeneously.

The pressure-sensitive adhesive layer must be relatively thin in order for well-crosslinked layers to be obtainable by chemical radiation methods. The thickness through which radiation can pass, though indeed varying as a function of density, accelerator voltage (EBC) and/or active wavelength (UV), is always greatly limited; accordingly, it is not possible to effect crosslinking through layers of arbitrary thickness, and certainly not homogeneously.

Also known in the prior art are a number of processes for the thermal crosslinking of acrylate hotmelts. In each of these processes a crosslinker is added to the acrylate melt prior to coating, and then the composition is shaped and wound to form a roll.

Direct thermal crosslinking of acrylate hotmelt compositions comprising NCO-reactive groups is described in EP 0 752 435 A1. The isocyanates used, which are free from blocking agents and are, more particularly, sterically hindered and dimerised isocyanates, require very drastic crosslinking conditions, and so a rational technical implementation presents problems. Under the kind of conditions which prevail on processing from the melt, the procedure described in EP 0 752 435 A1 leads to rapid and relatively extensive crosslinking, and so coating of the composition onto carrier materials is difficult. In particular it is not possible to obtain homogeneous layers of adhesive of the kind that are needed for many technical applications of adhesive tapes.

Also prior art is the use of blocked isocyanates. A disadvantage of this approach is the release of blocking groups or fragments which may have an adverse effect on the technical adhesive properties. One example is U.S. Pat. No. 4,524,104 A. It describes pressure-sensitive acrylate hotmelt adhesives which can be crosslinked using blocked polyisocyanates together with cycloamidines or salts thereof as catalyst. With this system, the required catalyst, but especially substances produced such as HCN, phenol, caprolactam or the like, may severely impair the product properties. With this approach, moreover, there is a need often for drastic conditions in order to release the reactive groups. Significant application of this approach is so far unknown and appears, furthermore, to be unattractive.

DE 10 2004 044 086 A1 describes a process for the thermal crosslinking of acrylate hotmelts that coats a solvent-free functionalized acrylate copolymer, which following metered addition of a thermally reactive crosslinker has a processing life that is long enough for compounding, conveying and coating, onto a web-form layer of a further material and then crosslinks this coating under mild conditions until the cohesion achieved is sufficient for pressure-sensitive adhesive tapes. A disadvantage of this process is that the reactivity of the crosslinker (isocyanate) predetermines the free processing life and the degree of crosslinking. Isocyanate crosslinkers react in some cases even during their addition; consequently, depending on the system, the gel-free time can be very short. A composition with a sizable fraction of functional groups such as hydroxyl groups or carboxylic acid can in that case no longer be applied sufficiently well. A streaky coat interspersed with gel specks and hence inhomogeneous would be the result. Another problem which arises is that the achievable degree of crosslinking is limited. If a higher degree of crosslinking through addition of a higher quantity of crosslinker is desired, this has disadvantages when polyfunctional isocyanates are used. The composition would react too quickly and would be coatable, if at all, only with a very short processing life and hence at very high coating speeds, which would exacerbate the problems of the non-homogeneous coating appearance.

Crosslinking by means of polyfunctional epoxides is described in EP 1 978 069 A1, it having been shown that through the use of accelerators, without which the epoxides would undergo, to all intents and purposes, no reaction with the carboxyl groups present in the polymer, the degree of crosslinking can be adjusted independently of the crosslinking kinetics. In order to make sure that the composition is coatable after melt processing, crosslinking in the extruder must take place only to a small extent and must subsequently continue at temperatures lower than in the extruder, in order for ideal product properties to be achieved. While the crosslinker-accelerator systems described in EP 1 978 069 A1 do meet this requirement and can be used industrially, the secondary crosslinking at room temperature was too slow. Secondary crosslinking at elevated temperatures is frequently undesirable if the PSAs have already been wound up into rolls, which may lose their shape as a result of the heat-treatment steps.

Epoxides react fundamentally only under the influence of heat, and more particularly only after prolonged supply of thermal energy. Known accelerator substances such as $ZnCl_2$, for example, do lead to an improvement in the reaction capacity within the temperature range of polymer melts, but in the absence of a supply of thermal energy from the outside (in other words, for example, at room temperature), the reactivity of the epoxides is lost, even in the presence of the accelerators, and so the crosslinking reaction breaks down (in other words, at the prevailing temperature, the accelerators no longer have an accelerating activity). This is a problem especially when the polyacrylates processed as a hotmelt are coated within relatively short time periods (several minutes) and then, in the absence of a further supply of heat, cooled rapidly down to room temperature or storage temperature. Without initiation of a further crosslinking reaction it would not be possible to achieve high degrees of crosslinking, and for numerous fields of application of polyacrylates, such as their use as PSAs in particular, this would have the very deleterious consequence of inadequate cohesion of the composition.

If the crosslinker system, with only thermally functioning accelerators, such as $ZnCl_2$, were to be introduced too early into the polyacrylate system (in order to achieve a sufficient degree of crosslinking), then the compositions would no longer be able to be homogeneously processed, more particularly compounded and coated, since they would crosslink too quickly or would even "gel" (undergo uncontrolled crosslinking). If, on the other hand, the accelerator causes too little activation of epoxide crosslinking, then a very long secondary crosslinking time can be expected or the compositions will have to be stored at high temperatures, which is undesirable.

It is an object of the present invention to enable thermal crosslinking of polyacrylate compositions which can be processed from the melt ("polacrylate hotmelts"), the intention being that there should be a sufficiently long processing life ("potlife") available for processing from the melt, especially as compared with the potlife in the case of the known thermal crosslinking systems for polyacrylate hotmelts. It ought at the same time to be possible to do without the use of protective groups, which would have to be removed again possibly by actinic radiation or other methods. Moreover, the intention is that it should be possible to set the degree of crosslinking of the polyacrylate composition to a desired level, without adversely affecting the advantages of the operating regime. Even at low temperatures, the secondary crosslinking is to proceed rapidly to an end level.

In the text below, the polyacrylate compositions are also referred to synonymously for short as "polyacrylates". For the noncrosslinked polyacrylate compositions, the term "polymerisates" is also used, while the term "polymers" is used for the fully or partly crosslinked polyacrylate compositions.

SUMMARY OF THE INVENTION

The above object is achieved by means of a specific crosslinker-accelerator system comprising at least one epoxide compound and at least one specifically substituted amine. A first subject of the invention, therefore, is a crosslinker-accelerator system for the thermal crosslinking of polyacrylates having functional groups suitable for entering into linking reactions with epoxide groups, comprising at least one substance comprising at least one epoxide group (crosslinker) and
at least one substance conforming to the general formula (I)

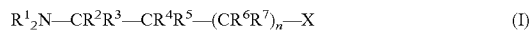
$$R^1{}_2N\text{—}CR^2R^3\text{—}CR^4R^5\text{—}(CR^6R^7)_n\text{—}X \qquad (I)$$

in which the radicals $R^1$ independently of one another are a hydrogen atom or a substituted or unsubstituted alkyl or cycloalkyl radical having 1 to 8 carbon atoms or with the nitrogen atom form a 5-7-membered ring which comprises at least 4 carbon atoms and not more than one further heteroatom as ring atoms; the radicals $R^2$, $R^3$, $R^4$, $R^5$, $R^6$ and $R^7$ independently of one another are a hydrogen atom or an alkyl radical having 1 to 8 carbon atoms or form a 5-7-membered cycloalkylene group; n is an integer from 0 to 4; and X is a group selected from —OH, —OR, —SH, —SR and —$PR_2$, in which the radicals R independently of one another are a $C_1$-$C_{18}$ alkyl radical, $C_2$-$C_{18}$ alkenyl radical or $C_2$-$C_{18}$ alkynyl radical which is in each case linear or branched and unsubstituted or substituted, or an unsubstituted or substituted aryl group or an aliphatic or aromatic heterocycle (accelerator).

A crosslinker-accelerator system of this kind enables, initially, comfortable processing lives for the polyacrylate compositions, while later a speedy secondary crosslinking is ensured even at low temperatures, more particularly at room temperature. The crosslinker-accelerator system of the invention avoids the above-recited disadvantages of conventional crosslinking systems, and is custom-tailored to the requirements of an industrially implemented operation for producing PSAs or PSA-coated products.

As a result of the inventive combination of the stated components it is possible to offer a thermal crosslinking process which when applied to the processing of polyacrylate hotmelt compositions does not lead to uncontrolled reactions (gelling of the composition) and leaves a sufficiently long time for processing (potlife), thus making it possible in particular to achieve a uniform and blister-free coating when the composition is coated out as a layer or is applied to a carrier. A very advantageous effect of the crosslinker-accelerator system of the invention is that the necessary secondary crosslinking of the polyacrylate composition after processing, more particularly after being coated out as a layer or applied to a carrier, proceeds rapidly, with a supply of thermal energy reduced significantly by comparison with melt production, in other words after cooling, without any need for actinic irradiation for this purpose. By rapid crosslinking is meant that the elastic fraction of the composition, measured by means of microshear travel method H3, is significantly more than 25%, more preferably more than 35%, within a week.

As a result of the crosslinker-accelerator system of the invention, the polyacrylates are capable of undergoing further crosslinking without further thermal energy (heating) supplied actively—that is, by technical process means—more particularly after cooling to room temperature (RT, 20° C.) or to a temperature close to room temperature. More particularly it is possible in this crosslinking phase to do without heating, without this leading to a termination of the crosslinking reaction.

DETAILED DESCRIPTION

A "crosslinker" for the purposes of the invention is a substance via which the polyacrylate molecules are linked to form three-dimensional structures by formation of covalent bonds.

An "accelerator" is a substance which supports the crosslinking reaction by ensuring a significantly increased crosslinking reaction rate in comparison to the absence of the accelerator. This is true, of course, in the case of comparable reaction parameters and more particularly at temperatures below the melting temperature of the polyacrylates. Within this temperature range, the crosslinking reaction without accelerators would not proceed at all or would proceed only very slowly. The accelerator, then, produces a substantial improvement in the reaction kinetics of the crosslinking reaction. In accordance with the invention this can be done catalytically, but also by incorporation into the reaction event.

"Polyacrylates" are polymers whose monomer basis, in terms of amount of substance, consists to an extent of at least 30% of acrylic acid, methacrylic acid, acrylic esters and/or methacrylic esters, with acrylic esters and/or methacrylic esters being present at least proportionally, generally and preferably to an extent of at least 30%. More particularly, a "polyacrylate" is a polymerisate which is obtainable by radical polymerization of acrylic and/or methylacrylic monomers and also, optionally, further, copolymerisable monomers.

The crosslinker-accelerator system of the invention comprises at least one substance which contains at least one epoxide group as crosslinker. Substances containing epoxide groups that are used are preferably polyfunctional epoxides, these being those which have at least two epoxide functions per molecule (i.e. are at least difunctional in respect of the epoxide groups). They may be either aromatic or aliphatic compounds.

Examples of suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like); epoxy ethers of polyhydric phenols (more particularly resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)-(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulphone) and also their hydroxyethyl ethers; phenolformaldehyde condensation products such as phenol alcohols, phenol aldehyde resins and the like; S- and N-containing epoxides (for example N,N-diglycidylaniline, N,N' dimethyldiglycidyl-4,4-diaminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids, or are obtainable from other acidic compounds (cyanuric acid, diglycidyl sulphide, cyclic trimethylene trisulphone and/or derivatives thereof, and others).

Examples of ethers containing epoxide groups that are very suitable in accordance with the invention include 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

The crosslinker-accelerator system of the invention further comprises at least one substance conforming to the general formula (I)

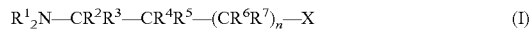
$$R^1{}_2N-CR^2R^3-CR^4R^5-(CR^6R^7)_n-X \qquad (I)$$

in which the radicals $R^1$ independently of one another are a hydrogen atom or a substituted or unsubstituted alkyl or cycloalkyl radical having 1 to 8 carbon atoms or with the nitrogen atom form a 5-7-membered ring which comprises at least 4 carbon atoms and not more than one further heteroatom as ring atoms; the radicals $R^2$, $R^3$, $R^4$, $R^5$, $R^6$ and $R^7$ independently of one another are a hydrogen atom or an alkyl radical having 1 to 8 carbon atoms or form a 5-7-membered cycloalkylene group; n is an integer from 0 to 4; and X is a group selected from —OH, —OR, —SH, —SR and —PR$_2$, in which the radicals R independently of one another are a $C_1$-$C_{18}$ alkyl radical, $C_2$-$C_{18}$ alkenyl radical or $C_2$-$C_{18}$ alkynyl radical which is in each case linear or branched and unsubstituted or substituted, or an unsubstituted or substituted aryl group or an aliphatic or aromatic heterocycle, as accelerator.

By "substituted" is meant that a hydrogen atom which is bonded to a carbon atom belonging to the respective radical is replaced by another atom or by a chemical group, such as a functional group, for example, where the group atom bonded directly to the relevant carbon atom of the radical may in particular also be a heteroatom, in other words not a carbon atom. The term "substituted alkyl radical" covers radicals which in spite of substitution can still be identified as alkyl radicals in terms of their essential nature. These include, for example, radicals that are hydroxylated or halogenated in position 1, in other words on the carbon atom bonded directly to the nitrogen, oxygen, sulphur or phosphorus atom. Not covered by the term "substituted alkyl radical", in contrast, are radicals, for example, whose carbon atom in position 1 is part of a carbonyl group or of a comparable functional group, which no longer allows the radical in question to be classed, in terms of its essential nature, among the alkyl radicals.

Suitable substances conforming to the general formula (I) are, for example, 2,2-(di-tert-butylphosphino)ethylamine, 2,2-(diisopropylphosphino)ethylamine, 2,2-(diphenylphosphino)ethylamine, N-(3-dimethylaminopropyl)-N,N-diisopropanolamine, (1R,2R)-2-(benzyloxy)cyclohexylamine and (1S,2S)-2-(benzyloxy)cyclohexylamine, N,N-di-methylethanolamine, bis(2-dimethylaminoethyl)ether, N,N,N'-trimethyl-N'-hydroxyethylbisaminoethyl ether, 2-(2-dimethylaminoethoxy)ethanol, N,N,N'-trimethylaminoethylethanolamine, 2,2'-dimorpholinodiethyl ether, trans-2-aminocyclohexanol, cis-2-aminocyclohexanol, bis(2-hydroxycyclohexyl)methylamine, N-cyclopentyl-2-methoxycyclohexylamine and (1S,2S)-2-(diphenylphosphino)cyclohexylamine. The substance conforming to the general formula (I) is preferably selected from the substances listed above.

Preferably X in the general formula (I) is a group selected from —OH, —OR and —PR$_2$. With functional groups of this kind it is possible, in combination with the substituted amino group on the other end of the molecule, to obtain a particularly active accelerator. More preferably X is a group selected from —OH and —OR. A corresponding accelerator with X=—OH and in which, moreover, one of the substituents R$^2$ and R$^3$ and also one of the substituents R$^4$ and R$^5$ together form a cyclohexylene group is 2-aminocyclohexanol, for example.

Very preferably X is a group selected from —OH and —OR, and R is an optionally substituted alkylaminoalkyl radical, such as, for example, a dimethylaminoethyl group Me$_2$N—(CH$_2$)$_2$— or an N-methyl-N-hydroxyethylaminoethyl group (HO(CH$_2$)$_2$—)MeN—(CH$_2$)$_2$—.

It has also been found that the distance between the functionality X and the amine functionality exerts a significant effect on the activity of the accelerator. It is preferred to use accelerators in which the group X is bonded via a C$_2$ bridge to the amine functionality. In the general formula (I), therefore, n is preferably 0 (zero).

It has also been found, surprisingly, that substances which have a cyclic spacer with a C$_2$ bridge between the amino functionality and the group X exhibit a particularly high accelerator activity. Preferred examples of such a structure are the aforementioned 2-aminocylohexanol, 2-(diphenylphosphino)cyclohexylamine, bis(2-hydroxycyclohexyl)methylamine and N-cyclopentyl-2-methoxycyclohexylamine. With very particular preference, substances of this kind display a trans configuration of the amine to the group X.

At least one of the radicals R$^1$ is preferably a substituted or unsubstituted alkyl or cycloalkyl radical having 1 to 8 carbon atoms. More preferably both radicals R$^1$ independently of one another are a substituted or unsubstituted alkyl or cycloalkyl radical having 1 to 8 carbon atoms. Very preferably the two radicals R$^1$ are each a methyl group.

The at least one substance conforming to the general formula (I) is preferably selected, in accordance with the invention, from bis(2-dimethylaminoethyl) ether, trans-2-aminocyclohexanol, cis-2-aminocyclohexanol and N,N,N'-trimethyl-N'-hydroxyethylbisaminoethyl ether. These substances allow particularly efficient activation of the linkage via the epoxide groups of the crosslinker.

A further subject of the present invention is a thermally crosslinkable composition which comprises at least one polyacrylate having functional groups suitable for entering into linking reactions with epoxide groups, and a crosslinker-accelerator system of the invention. This is more particularly a thermally crosslinkable composition which comprises at least one polyacrylate having functional groups which are suitable for entering into linking reactions of epoxide groups, and at least one substance which comprises at least one epoxide group (crosslinker), and also at least one substance conforming to the general formula (I)

$$R^1_2N—CR^2R^3—CR^4R^5—(CR^6R^7)_n—X \qquad (I)$$
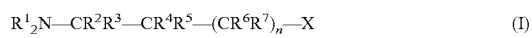

in which the radicals R$^1$ independently of one another are a hydrogen atom or a substituted or unsubstituted alkyl or cycloalkyl radical having 1 to 8 carbon atoms or with the nitrogen atom form a 5-7-membered ring which comprises at least 4 carbon atoms and not more than one further heteroatom as ring atoms; the radicals R$^2$, R$^3$, R$^4$, R$^5$, R$^6$ and R$^7$ independently of one another are a hydrogen atom or an alkyl radical having 1 to 8 carbon atoms or form a 5-7-membered, substituted or unsubstituted cycloalkylene group; n is an integer from 0 to 4; and X is a group selected from —OH, —OR, —SH, —SR and —PR$_2$, in which the radicals R independently of one another are a C$_1$-C$_{18}$-alkyl radical, C$_2$-C$_{18}$ alkenyl radical or C$_2$-C$_{18}$ alkynyl radical which is in each case linear or branched and unsubstituted or substituted, or an unsubstituted or substituted aryl group or an aliphatic or aromatic heterocycle (accelerator).

The total fraction of substances which comprise at least one epoxide group (crosslinkers) is preferably 0.1%-5% by weight, more preferably 0.15%-0.4% by weight, based on the pure (without additives) polyacrylate to be crosslinked. The total fraction of accelerator is preferably 0.05%-5% by weight, more preferably 0.1%-1.2% by weight, based on the additive-free polyacrylate to be crosslinked. "Pure polyacrylate to be crosslinked" means in accordance with the invention "only the polyacrylate to be crosslinked, without any additives". It is particularly advantageous if the crosslinker fraction is selected so as to result in an elastic fraction of the crosslinked polyacrylates of at least 20%. The elastic fraction is preferably at least 40%, more preferably at least 60% (measured in each case by measurement method H3; cf. Experimental Section).

As monomers or comonomers for preparing the polyacrylate it is preferred, accordingly, to make proportional use of functional monomers which are crosslinkable with epoxide groups. These are preferably monomers with acid groups (particularly carboxylic acid, sulphonic acid or phosphonic acid groups) and/or hydroxyl groups and/or acid anhydride groups and/or epoxide groups and/or amine groups; monomers containing carboxylic acid groups are particularly preferred. It is especially advantageous if the polyacrylate comprises copolymerized acrylic acid and/or methacrylic acid.

Further monomers which may be used as comonomers for the polyacrylate, besides acrylic and/or methacrylic esters having up to 30 C atoms, are, for example, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers.

The properties of the polyacrylate (pressure-sensitive adhesive; heat-sealing composition, viscoelastic non-tacky material and the like) may be influenced in particular by varying the glass transition temperature of the polymer, by means of different weight fractions of the individual monomers.

For purely crystalline systems there is a thermal equilibrium between crystal and liquid at the melting point $T_m$. Amorphous or semi-crystalline systems, in contrast, are characterized by the transformation of the more or less hard amorphous or semi-crystalline phase into a softer (rubber-like to viscous) phase. At the glass point, particularly in the case of polymeric systems, there is a "thawing" (or "freezing" in the case of cooling) of the Brownian molecular motion of relatively long chain segments.

The transition from the melting point $T_m$ (also "melting temperature"; really defined only for purely crystalline systems; "polymer crystals") to the glass transition point $T_g$ (also "glass transition temperature", "glass temperature") can therefore be considered to be a fluid transition, depending on the proportion of semi-crystallinity in the sample under analysis.

In the sense of the remarks above, when the glass transition point is stated, the reference for the purposes of this specification includes the melting point as well—in other words, the glass transition point (or else, synonymously, the glass transition temperature) is also understood to include the melting point for the corresponding "melting" systems. The statements of the glass transition temperatures relate to the determination by means of dynamic mechanical analysis (DMA) at low frequencies.

In order to obtain polymers, as for example pressure-sensitive adhesives or heat-sealing compositions, having desired glass transition temperatures, the quantitative composition of the monomer mixture is advantageously selected such that, in accordance with an equation (E1) in analogy to the Fox equation (cf. T. G. Fox, *Bull. Am. Phys. Soc.* 1956, 1, 123), the desired $T_g$ value for the polymer is produced.

$$\frac{1}{T_g} = \sum_n \frac{w_n}{T_{g,n}} \tag{E1}$$

In this equation, n represents the serial number of the monomers used, $w_n$ represents the mass fraction of the respective monomer n (% by weight), and $T_{g,n}$ represents the respective glass transition temperature of the homopolymer of each of the monomers n, in K.

It is preferred to use a polyacrylate which can be traced back to the following monomer composition:
a) acrylic and/or methacrylic esters of the following formula

CH$_2$=C(R$^I$)(COOR$^{II}$)

where R$^I$=H or CH$_3$ and R$^{II}$ is an alkyl radical having 4 to 14 C atoms,
b) olefinically unsaturated monomers having functional groups of the type already defined for reactivity with epoxide groups,
c) optionally further acrylates and/or methacrylates and/or olefinically unsaturated monomers which are copolymerizable with component (a).

For the use of the polyacrylate as a PSA, the fractions of the corresponding components (a), (b) and (c) are selected such that the polymerization product more particularly has a glass transition temperature ≤15° C. (DMA at low frequencies).

Especially for the preparation of PSAs it is very advantageous to select the monomers of component (a) with a fraction from 45% to 99% by weight, the monomers of component (b) with a fraction from 1% to 15% by weight and the monomers of component (c) with a fraction from 0% to 40% by weight (the figures are based on the monomer mixture for the "base polymer", i.e. without additions of any additives to the completed polymer, such as resins etc.).

For the use of the polyacrylate as a hotmelt adhesive, in other words as a material which acquires its pressure-sensitive tack only by virtue of heating, the fractions of components (a), (b), and (c) are selected more particularly such that the copolymer has a glass transition temperature ($T_g$) of between 15° C. and 100° C., preferably between 30° C. and 80° C., more preferably between 40° C. and 60° C.

A viscoelastic material, which may typically be laminated on both sides with pressure-sensitive adhesive layers, has a glass transition temperature ($T_g$) in particular of between −50° C. to +100° C., preferably between −20° C. to +60° C., more preferably 0° C. to 40° C. Here again, the fractions of components (a), (b) and (c) should be selected accordingly.

The monomers of component (a) are, in particular, plasticizing and/or apolar monomers. As monomers (a) it is preferred to use acrylic and methacrylic esters with alkyl groups consisting of 4 to 14 C atoms, more preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate or 2-ethylhexyl methacrylate, for example.

The monomers of component (b) are, in particular, olefinically unsaturated monomers having functional groups, in particular having functional groups which are able to enter into a reaction with the epoxide groups.

Preference for component (b) is given to using monomers having functional groups which are selected from the group encompassing: hydroxyl, carboxyl, sulphonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

As component (c) it is possible in principle to use all compounds with vinylic functionalization which are copolymerizable with component (a) and/or component (b). The monomers of component (c) can serve to adjust the properties of the resultant PSA.

Monomers by way of example for component (c) are as follows:
methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)-acrylamide, N-(n-octadecyl)acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide,
acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight Mw from 4000 to 13 000 g/mol), poly(methyl methacrylate)ethyl methacrylate (Mw from 2000 to 8000 g/mol).

Monomers of component (c) may advantageously also be selected such that they contain functional groups which support subsequent radiation-chemical crosslinking (by electron beams, UV, for example). Suitable copolymerizable photoinitiators are, for example, benzoin acrylate and acrylate-functionalized benzophenone derivatives. Monomers which support crosslinking by electron irradiation are, for example, tetrahydrofurfuryl acrylate, N-tert-butylacrylamide, and allyl acrylate.

The polyacrylates may be prepared by processes familiar to the skilled person, with particular advantage by conventional radical polymerizations or controlled free-radical polymerizations. The polyacrylates may be prepared by copolymerization of the monomeric components using the usual polymerization initiators and also, where appropriate, regulators (chain transfer agents), with polymerization taking place at the customary temperatures in bulk, in emulsion, such as in water or liquid hydrocarbons, for example, or in solution.

The polyacrylates are prepared preferably by polymerization of the monomers in solvents, more particularly in solvents with a boiling range from 50 to 150° C., preferably from 60 to 120° C., using the customary amounts of polymerization initiators, these generally being 0.01% to 5%, more particularly 0.1% to 2%, by weight (based on the total weight of the monomers).

Suitable in principle are all customary initiators that are familiar to the skilled person. Examples of free-radical sources are peroxides, hydroperoxides, and azo compounds, e.g., dibenzoyl peroxide, cumene hydroperoxide, cyclohexanone peroxide, di-tert-butyl peroxide, cyclohexylsulphonyl acetyl peroxide, diisopropyl percarbonate, tert-butyl peroctoate, benzopinacol. In one very preferred procedure, use is made as radical initiator of 2,2'-azobis(2-methylbutyronitrile) (Vazo® 67™ from DuPont) or 2,2'-azobis-(2-methylpropionitrile) (2,2'-azobisisobutyronitrile; AIBN; Vazo® 64™ from DuPont).

Solvents contemplated include alcohols such as methanol, ethanol, n- and iso-propanol, n- and iso-butanol, preferably isopropanol and/or isobutanol; and also hydrocarbons such as toluene and, in particular, benzines with a boiling range from 60 to 120° C. It is possible as well to use ketones such as, preferably, acetone, methyl ethyl ketone, methyl isobutyl ketone, and esters such as ethyl acetate, and also mixtures of solvents of the stated type, with preference going to mixtures containing isopropanol, particularly in amounts of 2% to 15% by weight, preferably 3% to 10% by weight, based on the solution mixture used.

The weight-average molecular weights $M_w$ of the polyacrylates are situated preferably within a range from 20 000 to 2 000 000 g/mol, very preferably within a range from 100 000 to 1 000 000 g/mol, and extremely preferably in a range from 150 000 to 500 000 g/mol; the figures for the average molecular weight $M_w$ and for the polydispersity PD in this specification relate to the determination by gel permeation chromatography (see measurement method A2; Experimental Section). For this purpose it may be advantageous to carry out the polymerization in the presence of suitable polymerization regulators such as thiols, halogen compounds and/or alcohols, in order to set the desired average molecular weight.

The polyacrylate preferably has a K value of 30 to 90, more preferably of 40 to 70, as measured in toluene (1% strength solution, 21° C.). The K value according to Fikentscher is a measure of the molecular weight and viscosity of the polymer.

Particularly suitable for the purpose of the invention are polyacrylates which have a narrow molecular weight distribution (polydispersity PD<4). In spite of a relatively low molecular weight, these compositions, after crosslinking, have a particularly good shear strength. Moreover, the lower molecular weight allows easier processing from the melt, since the flow viscosity is lower as compared with a broader-range polyacrylate, with largely the same application properties. Narrow-range polyacrylates may be prepared, advantageously, by anionic polymerization or by controlled radical polymerization methods, the latter being especially suitable. Examples of polyacrylates of this kind which are prepared by the RAFT process are described in U.S. Pat. No. 6,765,078 B2 and U.S. Pat. No. 6,720,399 B2. Polyacrylates of this kind can also be prepared via N-oxyls, as described in EP 1 311 555 B1, for example. Atom Transfer Radical Polymerization (ATRP) as well can be employed advantageously for the synthesis of narrow-range polyacrylates, in which case it is preferred as initiator to use monofunctional or difunctional, secondary or tertiary halides and, for abstracting the halide(s), complexes of Cu, Ni, Fe, Pd, Pt, Ru, Os, Rh, Co, Ir, Ag or Au. The various possibilities of ATRP are further described in specifications U.S. Pat. No. 5,945,491 A, U.S. Pat. No. 5,854,364 A and U.S. Pat. No. 5,789,487 A.

The polyacrylates to be crosslinked contain functional groups which are suitable for entering into linking reactions with epoxide groups. By linking reactions are meant, in particular, addition reactions and substitution reactions. Preferably, then, there is a linking of the units which carry the functional groups to the units which carry the epoxide groups, more particularly in the sense of a crosslinking of the polymer units which carry the functional groups, via the epoxide-group-carrying crosslinker molecules as linking bridges. The substances containing epoxide groups are preferably polyfunctional epoxides, in other words those having at least two epoxide groups; accordingly, there is overall an indirect linking of the units which carry the functional groups.

The crosslinkable composition of the invention may comprise at least one tackifying resin. Tackifying resins which can be used are the existing tackifier resins described in the literature. Reference may be made in particular to all aliphatic, aromatic and alkylaromatic hydrocarbon resins, hydrocarbon resins based on pure monomers, hydrogenated hydrocarbon resins, functional hydrocarbon resins, and natural resins. With preference it is possible to use pinene resins and indene resins, and rosins, their disproportionated, hydrogenated, polymerized and esterified derivatives and salts, terpene resins and terpene-phenolic resins, and also C5 resins, C9 resins and other hydrocarbon resins. Combinations of these and further resins may also be used with advantage in order to adjust the properties of the resultant composition in accordance with what is desired. With particular preference is it possible to use all resins that are compatible (soluble) with the polyacrylate in question. With particular preference the crosslinkable composition of the invention comprises terpene-phenolic resins and/or rosin esters.

The crosslinkable composition of the invention may optionally also comprise fillers in powder and/or granular form, likewise dyes and pigments, including more particularly abrasive and reinforcing fillers such as, for example, chalks ($CaCO_3$), titanium dioxides, zinc oxides and carbon blacks, even in high proportions, in other words from 1% to 50% by weight, based on the overall formula. With great preference it is possible to use various forms of chalk as a filler, with particular preference being given to the use of Mikrosöhl chalk. At preferred fractions of up to 30% by weight, based on the overall composition, the addition of fillers produces virtually no change in the technical adhesive properties (shear strength at RT, instantaneous bond strength to steel and PE).

Furthermore, fillers of low flammability, such as ammonium polyphosphate, for example; electrically conductive fillers such as conductive carbon black, carbon fibres and/or silver-coated beads, for example; thermally conductive materials such as boron nitride, aluminium oxide and silicon carbide, for example; ferromagnetic additives such as iron (III) oxides, for example; additives for increasing volume, more particularly for producing foamed layers or syntactic foams, such as, for example, expandants, solid glass beads, hollow glass beads, carbonized microbeads, hollow phenolic microbeads and microbeads of other materials, expandable microballoons (Expancel® from AkzoNobel), silica, silicates, organically renewable raw materials such as wood flour, for example, organic and/or inorganic nanoparticles, fibres; aging inhibitors, light stabilizers, ozone inhibitors, compounding agents and/or expandants, may be present in the crosslinkable composition or in the fully crosslinked composition. Aging inhibitors which can be used are preferably not only primary inhibitors, such as 4-methoxyphenol or Irganox® 1076, but also secondary aging inhibitors, such as Irgafos® TNPP or Irgafos® 168 from BASF, optionally also in combination with one another. Other aging inhibitors which can be used are phenothiazine (C radical scavenger) and also hydroquinone methyl ether in the presence of oxygen, and also oxygen itself.

Optionally it is possible to add customary plasticizers (plasticizing agents), more particularly in concentrations of up to 5% by weight. Plasticizers which can be metered in are, for example, low molecular weight polyacrylates, phthalates, water-soluble plasticizers, plasticizer resins, phosphates, polyphosphates, adipates and/or citrates.

As a further possible option, the thermally crosslinkable and/or crosslinked polyacrylate or polyacrylates may in accordance with the invention also be blended with other polymers. Suitable for this purpose are polymers based on natural rubber, synthetic rubber, EVA, silicone rubber, acrylic rubber and polyvinyl ether. It has proven to be useful to add these polymers in granulated or otherwise comminuted form to the polyacrylate before the thermal crosslinker is added. The polymer blends are produced preferably in an extruder, more preferably in a multi-screw extruder or in a planetary roller extruder. To stabilize the thermally crosslinked polyacrylates, especially polymer blends of thermally crosslinked acrylate hotmelts and other polymers, it may be sensible to irradiate the shaped material with a low dose of electron irradiation. For this purpose it is possible optionally to admix the polyacrylate with crosslinking promoters such as di-, tri- or polyfunctional acrylate, polyesters and/or urethane acrylate.

A further subject of the invention is a crosslinked polyacrylate which is obtainable by thermal crosslinking of the crosslinkable composition of the invention.

A further subject of the invention is a process for the thermal crosslinking of polyacrylates having functional groups which are suitable for entering into linking reactions with epoxide groups, said process encompassing the use of a crosslinker-accelerator system of the invention.

The process of the invention may include a concentration of the polyacrylate solution or dispersion resulting from the polymer preparation procedure. Concentration of the polymer may take place in the absence of the crosslinker and accelerator substances. It is also possible, however, for one at most of these substances to be added to the polymer even before concentration, in which case the concentration takes place in the presence of this or these substance(s).

The polymerisates are then preferably transferred to a compounder. In special versions of the process of the invention, concentration and compounding may take place in the same reactor.

The compounder used may in particular be an extruder. Within the compounder, the polymerisates are present preferably in the melt, either because they are in the melt state when they are introduced, or by virtue of their heating in the compounder until a melt is formed. The polymerisates are advantageously held in the melt in the compounder by heating.

Where neither crosslinkers (epoxides) nor accelerators are present in the polymerisate, the possible temperature in the melt is limited by the decomposition temperature of the polymerisate. The operational temperature within the compounder is typically between 80 to 150° C., more particularly between 100 and 120° C.

The substances containing epoxide groups are added to the polymer preferably before or with the addition of accelerator. They may be added to the monomers even before or during the polymerization phase, if they are sufficiently stable for that phase. With particular preference, however, the substances containing epoxide groups are added to the polymerisate either before addition to the compounder or during addition to the compounder, in other words are introduced into the compounder together with the polymerisates.

In a very preferred procedure the accelerator substances are added to the polymerisates shortly before further processing, more particularly before a coating or other shaping operation. The time window for the addition prior to coating is guided in particular by the potlife which is available, in other words the processing life in the melt, without deleterious change to the properties of the resultant product. With the process of the invention it was possible to achieve potlives of several minutes up to several tens of minutes (depending on the choice of the experimental parameters), and so the accelerator ought to be added within this time period prior to coating. The accelerator is advantageously added as late as possible to the melt, but as early as necessary, so that there is still effective homogenization with the polymer composition.

Time periods which have emerged as being very advantageous here are those from 2 to 10 minutes, more particularly those of more than 5 minutes, before the beginning of further processing, at an operating temperature of 110 to 120° C.

The crosslinkers (epoxides) and the accelerators can also both be added shortly before the further processing of the polymer, in other words advantageously in the phase as set out above for the accelerators. For this purpose it is advantageous if crosslinkers and accelerators are introduced into the operation simultaneously, at the same location, possibly in the form of an epoxide-accelerator blend.

In principle it is also possible to switch the times of addition and/or locations of addition for crosslinker and accelerator in the versions set out above, so that the accelerator may be added before the substances containing epoxide groups.

In the compounding operation, the temperature of the polymerisate on addition of the crosslinkers and/or accelerators is preferably between 50 and 150° C., more preferably between 70 and 130° C. and very preferably between 80 and 120° C.

It has emerged in principle as being very advantageous for the crosslinker, i.e. the substance containing epoxide groups, to be added at 0.1%-5% by weight, preferably 0.15%-0.4% by weight, based on the polymer without additives. It is advantageous to add the accelerator at 0.05%-5% by weight, preferably at 0.1%-1.2% by weight, based on the additive-free polymer. It is particularly advantageous if the crosslinker fraction is selected so as to result in an elastic fraction of the crosslinked polyacrylates of at least 20%. The elastic fraction is preferably at least 40%, more preferably at least 60% (measured in each case by measurement method H3; cf. Experimental Section).

After coating has taken place, the polymer composition cools relatively rapidly, down to the storage temperature, generally to room temperature. The crosslinker-accelerator system of the invention is outstandingly suitable for causing the crosslinking reaction to progress without the supply of further thermal energy (without heat supply). The inventive accelerator or accelerators and accelerator concentrations may advantageously be selected such that the elastic fraction of the polyacrylate after departure from the compounding operation, at lower temperatures than in the operation, such as at room temperature, for example, exceeds a level of 25%, preferably of 35%, within a week, preferably within three days, so that there is already a functional product (more particularly an adhesive tape or a functional carrier layer based on the polyacrylate).

The crosslinking reaction between the functional groups of the polyacrylate and the epoxides, by means of the crosslinker-accelerator system of the invention, thus proceeds even without supply of heat under standard conditions, more particularly at room temperature, to completion.

For stating the proportions of the constituents of the crosslinker-accelerator system of the invention to one another or to the polyacrylate to be crosslinked, it is possible to use the ratio of the number of epoxide groups in the crosslinker to the number of reactive functional groups in the polyacrylate. In principle this ratio can be selected freely, with either an excess of functional groups, numerical equality of the groups, or an excess of epoxide groups.

This ratio is preferably selected such that the epoxide groups are in deficit or at most in numerical equality; with very particular preference, the ratio of the total number of epoxide groups in the crosslinker to the number of functional groups in the polyacrylate that are suitable for entering into linking reactions with epoxide groups is in the range from 0.01:1 to 1:1, more particularly in the range from 0.02:1 to 0.4:1.

Preferably, therefore, the functional groups, more preferably carboxylic acid groups, in the polyacrylate are present in an excess over the epoxide groups, so that the polymerisate contains a sufficiently large number of functional groups—that is, potential crosslinking or linking sites—in order to achieve the desired crosslinking.

The ratio of the number of acceleration-active groups in the accelerator to the number of epoxide groups in the crosslinker may in principle be selected freely, so there is alternatively an excess of acceleration-active groups, numerical equality of the groups, or an excess of epoxide groups. Groups considered to be acceleration-active groups are amino groups and phosphino groups, terms which comprehend all primary, secondary and tertiary, and hence all substituted and unsubstituted, amino and phosphino groups. The ratio of the number of all the substituted and unsubstituted amino and phosphino groups in the accelerator to the number of epoxide groups in the crosslinker is preferably from 0.2:1 to 4:1.

After the composition has been compounded, the polymer can be processed further, more particularly by coating onto a permanent or temporary carrier. A permanent carrier remains joined to the layer of adhesive in the application, whereas the temporary carrier is removed in the course of further processing, as for example when converting the adhesive tape, or at the time of application of the layer of adhesive.

Coating of the self-adhesive compositions may take place using hotmelt coating nozzles known to the skilled person, or, preferably, using roll applicator mechanisms, also called coating calenders. The coating calenders may consist advantageously of two, three, four or more rolls.

Preferably at least one of the rolls is provided with an anti-adhesive roll surface, this being true preferably of all of the rolls that come into contact with the polyacrylate. In an advantageous procedure it is possible for all of the rolls of the calender to have an anti-adhesive finish. An anti-adhesive roll surface used is preferably a steel-ceramic-silicone composite. Roll surfaces of this kind are resistant to thermal and mechanical loads.

It has emerged as being particularly advantageous if roll surfaces are used that have a surface structure, more particularly of a kind such that the surface does not produce full contact with the polymer layer to be processed, but instead such that the area of contact is lower as compared with a smooth roll. Particularly advantageous are structured rolls such as engraved metal rolls—engraved steel rolls, for example.

Coating may take place with particular advantage in accordance with the coating techniques set out in WO 2006/027387 A1 from page 12, line 5 to page 20, line 13, and more particularly as in the sections "Variant A" (page 12), "Variant B" (page 13), "Variant C" (page 15), "Method D" (page 17), "Variant E" (page 19) and also Figures FIG. 1 to 6. The stated disclosure passages from WO 2006/027387 A1 are therefore explicitly included in the disclosure content of the present specification.

When coating it is possible to realise coating speeds of up to 300 m/min, especially when using multi-roll calenders.

BRIEF DISCUSSION OF THE DRAWINGS

Figure 2:
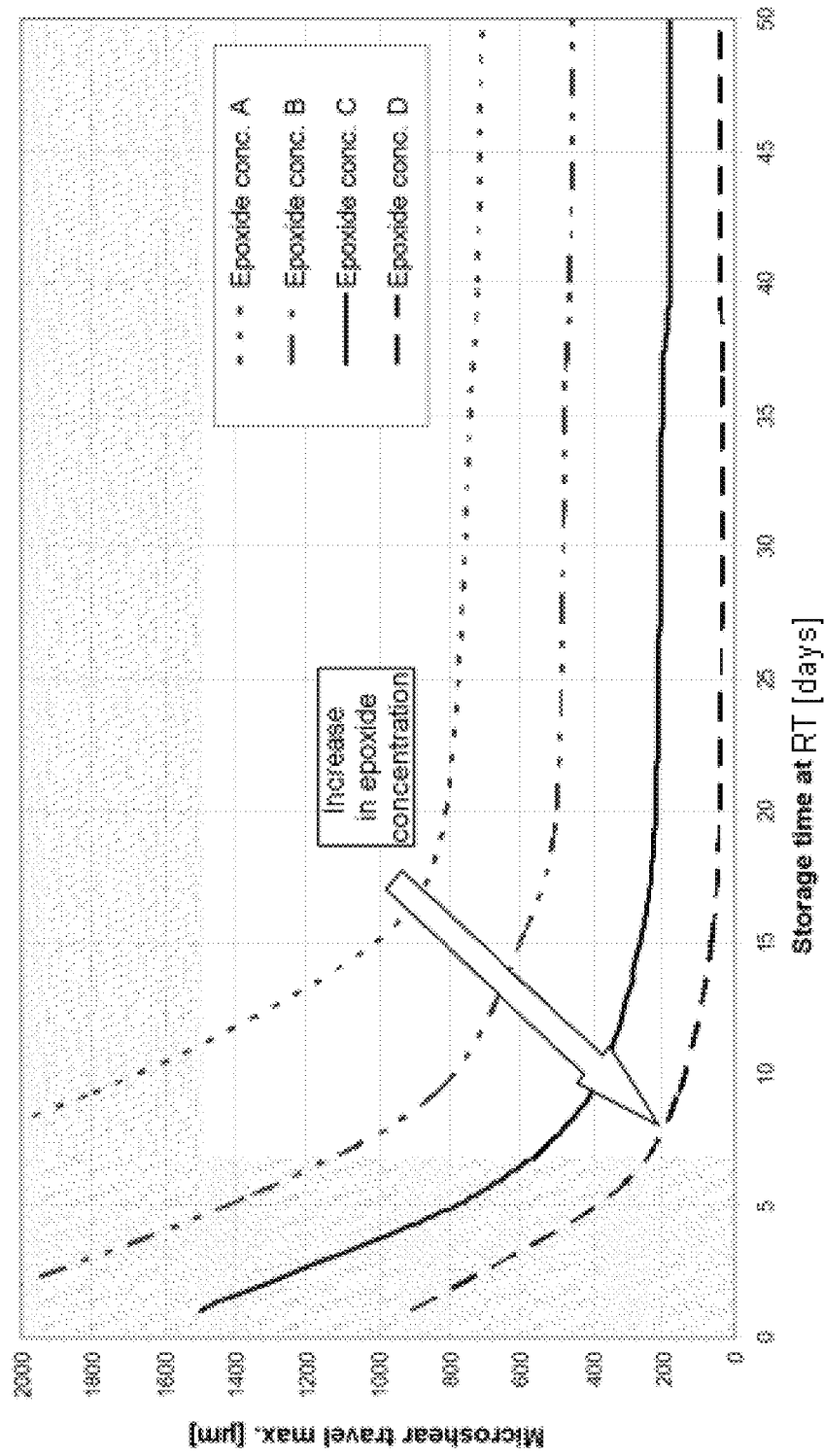

FIG. 1 illustrates a continuous process for the compounding and coating operation, FIG. 2 illustrates the effect of epoxide group concentration on the degree of crosslinking, FIG. 3 illustrates the relationship between crosslinking time and accelerator concentration, FIG. 4 illustrates microshear travel as a function of storage time.

Shown by way of example in FIG. 1 of the present specification is the compounding and coating operation, on the basis of a continuous process. The polymers are introduced at the first feed point (1.1) into the compounder (1.3), here for example an extruder. Either the introduction takes place already in the melt, or the polymers are heated in the compounder until the melt state is reached. At the first feed point, together with the polymer, the epoxide-containing compounds are advantageously introduced into the compounder.

Shortly before coating takes place, the accelerators are added at a second feed point (1.2). The outcome of this is that the accelerators are added to the epoxide-containing polymers not until shortly before coating, and the reaction time in the melt is low.

The reaction regime may also be discontinuous. In corresponding compounders such as reactor tanks, for example, the addition of the polymers, of the crosslinkers and of the accelerators may take place at different times and not, as shown in FIG. 1, at different locations.

Immediately after coating—preferably by means of roll application or by means of an extrusion die—the polymer is only slightly crosslinked, but not yet sufficiently crosslinked. The crosslinking reaction preferably proceeds predominantly on the carrier.

Crosslinking raises the cohesion of the polymer and hence also the shear strength. The links are very stable. This allows very aging-stable and heat-resistant products to be produced, such as adhesive tapes, viscoelastic carrier materials or shaped articles.

The physical properties of the end product, especially its viscosity, bond strength and tack, can be influenced through the degree of crosslinking, and so the end product can be optimized through an appropriate choice of the reaction conditions. A variety of factors determine the operational window of this process. The most important influencing variables are the amounts (concentrations and proportions relative to one another), the chemical nature of the crosslinkers and the accelerators, the operating and coating temperatures, the residence time in the compounder (more particularly extruder) and in the coating assembly, the fraction of functional groups, more particularly acid groups and/or hydroxyl groups, in the polymer, and also the average molecular weight of the polyacrylate.

The crosslinker-accelerator system of the invention, in processes for the crosslinking of polyacrylates, offers the advantage that a stable crosslinking process for polyacrylates can be offered, and one with outstanding control facility in relation to the crosslinking pattern, by virtue of substantial decoupling of degree of crosslinking and reactivity (reaction kinetics), more particularly the reaction kinetics at low temperatures. The amount of crosslinker (amount of epoxide) added here largely influences the degree of crosslinking of the product, the chemical nature and the concentration of the accelerator largely control the reactivity.

Surprisingly it has been observed that through the amount of epoxide-containing substances added it has been possible to preselect the degree of crosslinking, and to do so largely independently of the process parameters that typically require additional selection: temperature and amount of added crosslinker.

The effect of epoxide group concentration on the degree of crosslinking for a given amount of accelerator and a given temperature is shown schematically by FIG. 2. Here, the accelerator concentration rises from the concentration A (top curve; low concentration) via the concentrations B (second-lowest concentration) and C (second-highest concentration) to the concentration D (bottom curve; highest concentration). As can be seen, the final value of the degree of crosslinking—represented here by increasingly smaller values for the microshear travel—goes up as the epoxide concentration increases, whereas the reaction kinetics remain virtually unaffected.

It has also been found that the amount of accelerator added has a direct influence on the crosslinking rate, and hence also on the point in time at which the final degree of crosslinking is achieved, but without influencing it absolutely. The reactivity of the crosslinking reaction here may be selected such that the crosslinking also during storage of the completed product under the conditions customary therein (room temperature) leads within a few weeks to the desired degree of crosslinking, more particularly without any need for thermal energy to be (actively) supplied or for the product to be treated further.

The relationship between crosslinking time and accelerator concentration for a given temperature (in this case room temperature) and with a constant amount of epoxide is reproduced schematically in FIG. 3. Here, the accelerator concentration rises from the concentration 1 (top curve; low concentration) via the concentrations 2 (second-lowest concentration) and 3 (second-highest concentration) to the concentration 4 (bottom curve; highest concentration). Here it is found that the final value of the degree of crosslinking remains virtually constant (in the case of the lowest reaction, this value has not yet been reached); with high concentrations of accelerator, however, this value is reached more quickly than at low concentrations of accelerator.

In addition to the aforementioned parameters, the reactivity of the crosslinking reaction can also be influenced by varying the temperature, if desired, especially in those cases where the advantage of "inherent crosslinking" in the course of storage under standard conditions has no part to play. At constant crosslinker concentration, an increase in the operating temperature leads to a reduced viscosity, which enhances the coatability of the composition but reduces the processing life.

An increase in the processing life is acquired by a reduction in the accelerator concentration, reduction in molecular weight, reduction in the concentration of functional groups in the addition polymer, reduction of the acid fraction in the addition polymer, use of less-reactive crosslinkers (epoxides) or of less-reactive crosslinker-accelerator systems, and reduction in operating temperature.

An improvement in the cohesion of the composition can be obtained by a variety of pathways. In one, the accelerator concentration is increased, which reduces the processing life. At constant accelerator concentration, it also possible to raise the molecular weight of the polyacrylate, which is possibly more efficient. In the sense of the invention it is advantageous in any case to raise the concentration of crosslinker (substances containing epoxide groups). Depending on the desired requirements profile of the composition or of the product it is necessary to adapt the abovementioned parameters in a suitable way.

A further subject of the invention is the use of a crosslinker-accelerator system of the invention for producing thermally crosslinked polyacrylates.

Inventively crosslinked polyacrylates can be used for a broad range of applications. Below, a number of particularly advantageous fields of use are set out by way of example.

A polyacrylate crosslinked with the crosslinker-accelerator system of the invention is used in particular as a pressure-sensitive adhesive (PSA), preferably as a PSA for an adhesive tape, where the acrylate PSA is in the form of a single-sided or double-sided film on a carrier sheet. These polyacrylates are especially suitable when a high coat weight in one coat is required, since with this coating technique it is possible to achieve an almost arbitrarily high coat weight, preferably more than 100 g/m², more preferably more than 200 g/m², and to do so in particular at the same time as homogeneous crosslinking through the coat. Examples of favourable applications are technical adhesive tapes, more especially for use in construction, examples being insulating tapes, corrosion control tapes, adhesive aluminium tapes, fabric-reinforced film-backed adhesive tapes (duct tapes), special-purpose adhesive construction tapes, such as vapour barriers, adhesive assembly tapes, cable wrapping tapes, self-adhesive sheets and/or paper labels.

The inventively crosslinked polyacrylate may also be made available as a PSA for a carrierless adhesive tape, in the form of what is called an adhesive transfer tape. Here as well, the possibility of setting the coat weight almost arbitrarily high in conjunction with homogeneous crosslinking through the coat is a particular advantage. Preferred weights per unit area are more than 10 g/m² to 5000 g/m², more preferably 100 g/m² to 3000 g/m².

The inventively crosslinked polyacrylate may also be present in the form of a heat-sealing adhesive in adhesive transfer tapes or single-sided or double-sided adhesive tapes. Here as well, for carrier-containing pressure-sensitive adhesive tapes, the carrier may be an inventively obtained viscoelastic polyacrylate.

One advantageous embodiment of the adhesive tapes obtained using an inventively crosslinked polyacrylate can be used as a strippable adhesive tape, more particularly a tape which can be detached again without residue by pulling substantially in the plane of the bond.

The crosslinker-accelerator system of the invention or the crosslinker composition of the invention is also particularly suitable for producing three-dimensional shaped articles, whether they be tacky or not. A particular advantage of this process is that there is no restriction on the layer thickness of the polyacrylate to be crosslinked and shaped, in contrast to UV and EBC curing processes. In accordance with the choice of coating assembly or shaping assembly, therefore, it is possible to produce structures of any desired shape, which are then able to continue crosslinking to desired strength under mild conditions.

This system or composition is also particularly suitable for the production of particularly thick layers, especially of pressure-sensitive adhesive layers or viscoelastic acrylate layers, with a thickness of more than 80 µm. Layers of this kind are difficult to produce with the solvent technology, since, for example, this technology entails bubble formation and very slow coating speeds. The alternative lamination of thin layers one over another is complicated and harbours weak points.

Thick pressure-sensitive adhesive layers may be present, for example, in unfilled form, as straight acrylate, or in resin-blended form or in a form filled with organic or inorganic fillers. Also possible is the production of layers foamed to a closed-cell or open-cell form in accordance with the known techniques, as well as of syntactic foams, using the crosslinker-accelerator system of the invention or the thermally crosslinkable composition of the invention. Possible methods of foaming are those of foaming via compressed gases such as nitrogen or $CO_2$, or foaming via expandants such as hydrazines or expandable microballoons. Where expandable microballoons are used, the composition or the shaped layer is advantageously activated suitably by means of heat introduction. Foaming may take place in the extruder or after coating. It may be judicious to smooth the foamed layer by means of suitable rollers or release films. To produce foam-analogous layers it is also possible to add hollow glass beads or pre-expanded polymeric microballoons to the tacky, thermally crosslinked polyacrylate.

In particular it is possible, using systems or compositions of the invention, to produce thick layers as well, which can be used as a carrier layer for double-sidedly PSA-coated adhesive tapes. With particular preference these are filled and foamed layers which can be utilized as carrier layers for foamlike adhesive tapes. With these layers as well it is sensible to add hollow glass beads, solid glass beads or expanding microballoons to the polyacrylate prior to the addition of the crosslinker-accelerator system or of the crosslinker or of the accelerator. It is possible to laminate a pressure-sensitive adhesive layer onto at least one side of a foamlike viscoelastic layer of this kind. It is preferred to laminate a corona-pretreated polyacrylate layer on both sides. Alternatively it is possible to laminate differently pretreated adhesive layers, i.e. pressure-sensitive adhesive layers and/or heat-activable layers based on polymers other than on acrylates, onto the viscoelastic layer. Suitable base polymers are adhesives based on natural rubber, synthetic rubbers, acrylate block copolymers, styrene block copolymers, EVA, certain polyolefins, specific polyurethanes, polyvinyl ethers, and silicones. Preferred compositions, however, are those which have no significant fraction of migratable constituents and whose compatibility with the polyacrylate is so good that they diffuse in significant quantities into the acrylate layer and alter the properties therein.

Instead of laminating a pressure-sensitive adhesive layer onto both sides, it is also possible on at least one side to use a hotmelt-adhesive layer or thermally activable adhesive layer. Asymmetric adhesive tapes of this kind allow the bonding of critical substrates with a high bonding strength. An adhesive tape of this kind can be used, for example, to affix EPDM rubber profiles to vehicles.

One particular advantage of the inventively crosslinked polyacrylates is that these layers, whether utilized as a viscoelastic carrier, as a pressure-sensitive adhesive or as a heat-sealing composition, combine an equal surface quality with no crosslinking profile through the layer (or, correspondingly, through the shaped article produced from the polyacrylates)—in particular in contrast to UV-crosslinked and EBC-crosslinked layers. As a result it is possible for the balance between adhesive and cohesive properties to be controlled and set ideally for the layer as a whole through the crosslinking. In the case of radiation-crosslinked layers, in contrast, there is generally one side or one sublayer which is over- or undercrosslinked.

EXAMPLES

Measurement Methods (General):
K Value (According to Fikentscher) (Measurement Method A1):

The K value is a measure of the average molecular size of high-polymer materials. It is measured by preparing one percent strength (1 g/100 ml) toluenic polymer solutions and determining their kinematic viscosities using a Vogel-Ossag viscometer. Standardization to the viscosity of the toluene gives the relative viscosity, from which the K value can be calculated by the method of Fikentscher (*Polymer* 1967, 8, 381 ff.)
Gel Permeation Chromatography GPC (Measurement Method A2):

The figures for the weight-average molecular weight $M_w$ and the polydispersity PD in this specification relate to the determination by gel permeation chromatography. Determination is made on a 100 µl sample subjected to clarifying filtration (sample concentration 4 g/l). The eluent used is tetrahydrofuran with 0.1% by volume of trifluoroacetic acid. Measurement takes place at 25° C. The preliminary column used is a column type PSS-SDV, 5µ, $10^3$ Å, ID 8.0 mm 50 mm. Separation is carried out using the columns of type PSS-SDV, 5µ, $10^3$ Å and also $10^5$ Å and $10^6$ Å each with ID 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).
Solids Content (Measurement Method A3):

The solids content is a measure of the fraction of non-evaporable constituents in a polymer solution. It is determined gravimetrically, by weighing the solution, then evaporating the evaporable fractions in a drying cabinet at 120° C. for 2 hours and reweighing the residue.
Measurement Methods (PSAs):
180° Bond Strength Test (Measurement Method H1):

A strip 20 mm wide of an acrylate PSA applied to polyester as a layer was applied to steel plates which beforehand had been washed twice with acetone and once with isopropanol. The pressure-sensitive adhesive strip was pressed onto the substrate twice with an applied pressure corresponding to a weight of 2 kg. The adhesive tape was then removed from the substrate immediately with a speed of 300 mm/min and at an angle of 180°. All measurements were conducted at room temperature.

The results are reported in N/cm and have been averaged from three measurements. The bond strength to polyethylene (PE) was determined analogously.
Holding Power (Measurement Method H2):

A strip of the adhesive tape 13 mm wide and more than 20 mm long (30 mm, for example) was applied to a smooth steel surface which had been cleaned three times with acetone and once with isopropanol. The bond area was 20 mm·13 mm (length·width), the adhesive tape protruding beyond the test plate at the edge (by 10 mm, for example, corresponding to aforementioned length of 30 mm). Subsequently the adhesive tape was pressed onto the steel support four times, with an applied pressure corresponding to a weight of 2 kg. This sample was suspended vertically, with the protruding end of the adhesive tape pointing downwards.

At room temperature, a weight of 1 kg was affixed to the protruding end of the adhesive tape. Measurement is conducted under standard conditions (23° C., 55% humidity) and at 70° C. in a thermal cabinet.

The holding power times measured (times taken for the adhesive tape to detach completely from the substrate; measurement terminated at 10 000 min) are reported in minutes and correspond to the average value from three measurements.
Microshear Test (Measurement Method H3):

This test serves for the accelerated testing of the shear strength of adhesive tapes under temperature load.
Sample Preparation for Microshear Test:

An adhesive tape (length about 50 mm, width 10 mm) cut from the respective sample specimen is adhered to a steel test plate, which has been cleaned with acetone, in such a way that the steel plate protrudes beyond the adhesive tape to the right and the left, and that the adhesive tape protrudes beyond the test plate by 2 mm at the top edge. The bond area of the sample in terms of height·width=13 mm·10 mm. The bond site is subsequently rolled over six times with a 2 kg steel roller at a speed of 10 m/min. The adhesive tape is reinforced flush with a stable adhesive strip which serves as a support for the travel sensor. The sample is suspended vertically by means of the test plate.
Microshear Test:

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is reported as the result in µm, as both the maximum value ["max"; maximum shear travel as a result of 15-minute loading]; and the minimum value ["min"; shear travel ("residual deflection") 15 minutes after unloading; on unloading there is a backward movement as a result of relaxation]. Likewise reported is the elastic component in percent ["elast"; elastic fraction= (max·min)·100/max].
Measurement Methods (Three-Layer Constructions):
90° Bond Strength to Steel—Open and Lined Side (Measurement Method V1):

The bond strength to steel is determined under test conditions of 23° C.+/−1° C. temperature and 50%+/−5% relative humidity. The specimens were cut to a width of 20 mm and adhered to a steel plate. Prior to the measurement the steel plate is cleaned and conditioned. For this purpose the plate is first wiped down with acetone and then left to stand in the air for 5 minutes to allow the solvent to evaporate. The side of the three-layer assembly facing away from the test substrate was then lined with a 50 µm aluminium foil, thereby preventing the sample from expanding in the course of the measurement. This was followed by the rolling of the test specimen onto the steel substrate. For this purpose the tape was rolled over 5 times back and forth with a rolling speed of 10 m/min using a 2 kg roller. Immediately after the rolling-on operation, the steel plate was inserted into a special mount which allows the specimen to be removed at an angle of 90° vertically upwards. The measurement of bond strength was made using a Zwick tensile testing machine. When the lined side is applied to the steel plate, the open side of the three-layer assembly is first laminated to the 50 µm aluminium foil, the release material is removed, and the system is adhered to the steel plate, and subjected to analogous rolling-on and measurement.

The results measured on both sides, open and lined, are reported in N/cm and are averaged from three measurements.

Holding Power—Open and Lined Side (Measurement Method V2):

Specimen preparation took place under test conditions of 23° C.+/−1° C. temperature and 50%+/−5% relative humidity. The test specimen was cut to 13 mm and adhered to a steel plate. The bond area is 20 mm·13 mm (length·width). Prior to the measurement, the steel plate was cleaned and conditioned. For this purpose the plate was first wiped down with acetone and then left to stand in the air for 5 minutes to allow the solvent to evaporate. After bonding had taken place, the open side was reinforced with a 50 µm aluminium foil and rolled over back and forth 2 times using a 2 kg roller. Subsequently a belt loop was attached to the protruding end of the three-layer assembly. The whole system was then suspended from a suitable device and subjected to a load of 10 N. The suspension device is such that the weight loads the sample at an angle of 179°+/−1°. This ensures that the three-layer assembly is unable to peel from the bottom edge of the plate. The measured holding power, the time between suspension and dropping of the sample, is reported in minutes and corresponds to the average value from three measurements. To measure the lined side, the open side is first reinforced with the 50 µm aluminium foil, the release material is removed, and adhesion to the test plate takes place as described. The measurement is conducted under standard conditions (23° C., 55% humidity).

| Commercially available chemicals used | | | |
|---|---|---|---|
| Chemical compound | Trade name | Manufacturer | CAS No. |
| 2,2'-Azobis(2-methylbutyronitrile) | Vazo ® 67 | DuPont | 13472-08-7 |
| 2,2'-Azobis(isobutyronitrile), AIBN | Vazo ® 64 | DuPont | 78-67-1 |
| Bis-(4-tert-butylcyclohexyl) peroxydicarbonate | Perkadox ® 16 | Akzo Nobel | 15520-11-3 |
| Terpene-phenolic-based tackifier resin (softening point 105° C., hydroxyl value 30-60) | Dertophene ® T105 | DRT, France | 73597-48-5 |
| Pentaerythritol tetraglycidyl ether | Polypox ® R16 | UPPC AG | 3126-63-4 |
| 3,4-Epoxycyclohexylmethyl-3,4-epoxycyclohexanecarboxylate | Uvacure ® 1500 | Cytec Industries Inc. | 2386-87-0 |
| Dimethyl propanephosphonate | Levagard ® DMPP | Lanxess | 18755-43-6 |
| Bis-(2-dimethylaminoethyl) ether | Jeffcat ® ZF-20 | Huntsman | 3033-62-3 |
| trans-2-Aminocyclohexanol | | Sigma-Aldrich | 5456-63-3 |
| N,N,N'-Trimethyl-N'-hydroxyethylbisaminoethyl ether | Jeffcat ® ZF-10 | Huntsman | 83016-70-0 |
| Isophoronediamine | | Sigma-Aldrich | 2855-13-2 |
| N,N,N,N,N-Pentamethyl-diethylenetriamine | Jeffcat ® ZR-40 | Huntsman | 3030-47-5 |
| N'-(3-(Dimethylamino)propyl)-N,N-dimethyl-1,3-propanediamine | Jeffcat ® Z-130 | Huntsman | 6711-48-4 |
| Diethylenetriamine | Epikure ® 3223 | Hexion Spec. Chemicals | 111-40-0 |
| N,N,N,N-Tetramethyl-methanediamine | | Sigma-Aldrich | 51-80-9 |
| Thermoplastic hollow microbeads (particle size 10-17 µm; density max. 0.017 g/cm$^3$; expansion temperature 127-139° C. [start]; 164-184° C. [max. exp.]) | Expancel ® 092 DU 40 | Akzo Nobel | | all specification figures at 20° C.;
Epikure ® also marketed under the tradenames Epi-Cure ® and Bakelite ® EPH Pressure Sensitive Adhesive (PSA) Examples Preparation of Starting Polymers for Examples B1 to B9

Described below is the preparation of the starting polymers. The polymers investigated are prepared conventionally via free radical polymerization in solution.

Base Polymer P1

A reactor conventional for free-radical polymerizations was charged with 30 kg of 2-ethylhexyl acrylate, 67 kg of n-butyl acrylate, 3 kg of acrylic acid, 0.5 kg and 66 kg of acetone/isopropanol (96:4). After nitrogen gas had been passed through the reactor for 45 minutes with stirring, the reactor was heated to 58° C. and 50 g of 2,2'-azobis(2-methylbutyronitrile) were added. Subsequently the external heating bath was heated to 75° C. and the reaction was carried out constantly at this external temperature. After 1 h a further 50 g of 2,2'-azobis(2-methylbutyronitrile) were added, and after 4 h the batch was diluted with 20 kg of acetone/isopropanol mixture (96:4).

After 5 h and again after 7 h, reinitiation took place with 150 g of bis(4-tert-butylcyclohexyl)peroxydicarbonate in each case. After a reaction time of 22 h the polymerization was terminated and the batch was cooled to room temperature. The polyacrylate has a conversion of 99.6%, a K value of 79.6, an average molecular weight of $M_w$=1 557 000 g/mol, polydispersity PD ($M_w/M_n$)=12.6.

Base Polymer P2

A reactor conventional for free-radical polymerizations was charged with 47.5 kg of 2-ethylhexyl acrylate, 47.5 kg of n-butyl acrylate, 5 kg of acrylic acid, 150 g of dibenzoyl trithiocarbonate and 66 kg of acetone. After nitrogen gas had been passed through the reactor for 45 minutes with stirring, the reactor was heated to 58° C. and 50 g of AIBN were added. Subsequently the external heating bath was heated to 75° C. and the reaction was carried out constantly at this external temperature. After 1 hour a further 50 g of AIBN were added. After 4 h the batch was diluted with 10 kg of acetone. After 5 h and again after 7 h, 150 g each time of bis(4-tert-butylcyclohexyl) peroxydicarbonate were added. After a reaction time of 22 h the polymerization was terminated and the batch was cooled to room temperature.

The polyacrylate has a conversion of 99.5%, a K value of 41.9 and an average molecular weight of $M_w$=367 000 g/mol, polydispersity PD ($M_w/M_n$)=2.8.

Base Polymer P3

In the same way as for Example P1, 30 kg of 2-ethylhexyl acrylate, 67 kg of n-butyl acrylate and 3 kg of acrylic acid were polymerized in 66 kg of acetone/isopropanol (96:4). Initiation was carried out twice with 50 g each time of 2,2'-azobis(2-methylbutyronitrile), twice with in each case 150 g of bis(4-tert-butylcyclohexyl) peroxydicarbonate, and dilution with 23 kg of acetone/isopropanol mixture (96:4). After a reaction time of 22 h the polymerization was terminated and the batch was cooled to room temperature.

The polyacrylate has a conversion of 99.6%, a K value of 75.1 and an average molecular weight of $M_w$=1 480 000 g/mol, polydispersity PD ($M_w/M_n$)=16.1.

Base Polymer P4 (Viscoelastic Carrier)

In the same way as in Example P1, 68 kg of 2-ethylhexyl acrylate, 25 kg of methyl acrylate and 7 kg of acrylic acid were polymerized in 66 kg of acetone/isopropanol (94:6). Initiation was carried out twice with 50 g of 2,2-azobis(2-methylbutyronitrile) in each case, twice with 150 g of bis(4-tert-butylcyclohexyl)peroxydicarbonate in each case, and dilution was carried out with 20 kg of acetone/isopropanol mixture (94:6). After a reaction time of 22 h the polymerization was terminated and the batch was cooled to room temperature.

The polyacrylate has a conversion of 99.7%, a K value of 51.3 and an average molecular weight of $M_w$=676 000 g/mol, polydispersity PD ($M_w/M_n$)=9.5.

Process 1: Concentration/Preparation of the Hotmelt PSAs:

The acrylate copolymers (base polymers P1 to P4) are very largely freed from the solvent by means of a single-screw extruder (concentrating extruder, Berstorif GmbH, Germany) (residual solvent content 0.3% by weight; cf. the individual examples). The parameters given here by way of example are those for the concentration of base polymer P1. The screw speed was 150 rpm, the motor current 15 A, and a throughput of 58.0 kg liquid/h was realized. For concentration, a vacuum was applied at 3 different domes. The reduced pressures were, respectively, between 20 mbar and 300 mbar. The exit temperature of the concentrated hotmelt is approximately 115° C. The solids content after this concentration step was 99.8%.

Process 2: Preparation of the Modified Hotmelt PSAs and Viscoelastic Carriers:

The acrylate hotmelt PSAs prepared in accordance with Process 1 as elucidated above were conveyed directly into a downstream Welding twin-screw extruder (Welding Engineers, Orlando, USA; model 30 mm DWD; screw diameter 30 mm, length of screw 1=1258 mm; length of screw 2=1081 mm; 3 zones). Via a solids metering system, the resin Dertophene® T105 was metered in zone 1 and mixed in homogeneously. In the case of the composition for Examples MT 1, no resin was metered in; instead, the hollow thermoplastic microbeads, mixed to a paste with Levagard® DMPP beforehand, were metered in via the solids metering system. The parameters given here by way of example are those for resin compounding with base polymer P1. The speed was 451 rpm, the motor current 42 A, and a throughput of 30.1 kg/h was realized. The temperatures of zones 1 and 2 were each 105° C., the melt temperature in zone 1 was 117° C., and the composition temperature on exit (zone 3) was 100° C.

Process 3: Production of the Inventive Adhesive Tapes, Blending with the Crosslinker-Accelerator System for Thermal Crosslinking, and Coating:

The acrylate hotmelt PSAs prepared by Processes 1-2 were melted in a feeder extruder (single-screw conveying extruder from Troester GmbH & Co. KG, Germany) and using this extruder were conveyed as a polymer melt into a twin-screw extruder (Leistritz, Germany, ref. LSM 30/34). The assembly is heated electrically from the outside and is air-cooled by a number of fans, and is designed such that, with effective distribution of the crosslinker-accelerator system in the polymer matrix, there is at the same time a short residence time ensured for the adhesive in the extruder. For this purpose the mixing shafts of the twin-screw extruder were arranged in such a way that conveying elements are in alternation with mixing elements. The addition of the respective crosslinkers and accelerators is made with suitable metering equipment, where appropriate at two or more points (FIG. 1: metering points 1.1 and 1.2) and, where appropriate, with the use of metering assistants into the unpressurized conveying zones of the twin-screw extruder. Following exit of the ready-compounded adhesive, i.e. of the adhesive blended with the crosslinker-accelerator system, from the twin-screw extruder (exit: circular die, 5 mm diameter), coating takes place in accordance with FIG. 1 onto a carrier material in web form.

The time between metered addition of the crosslinker-accelerator system and the shaping or coating procedure is termed the processing life. The processing life indicates the period within which the adhesive, blended with the crosslinker-accelerator system, or the viscoelastic carrier layer, can be coated with a visually good appearance (gel-free, speck-free). Coating takes place with web speeds between 1 m/min and 20 m/min; the doctor roll of the 2-roll applicator is not driven.

In the examples below and in Tables 1 and 3 to 4, the formulations employed, the production parameters and the properties obtained are each described in more detail.

Examples B1 to B4

The base polymers P1 to P4 were polymerized in accordance with the polymerization process described, concentrated in accordance with Process 1 (solids content 99.8%)

and then blended with the Dertophene® T105 resin in accordance with Process 2. These resin-modified acrylate hotmelt compositions were then compounded in accordance with Process 3 continuously with the crosslinker-accelerator system consisting of a Pentaerythritol tetraglycidyl ether,
in this case Polypox® R16 from UPPC AG (epoxide) and a Bis(2-dimethylaminoethyl) ether,
In this case Jeffcat® ZF-20 from HUNTSMAN (amine accelerator).

Detailed description: In the twin-screw extruder described in Process 3, a total mass flow consisting of 70 parts of one of the polymers P1 to P4 and 30 parts each of Dertophene® T105 resin of 533.3 g/min (corresponding to 373 grams of the pure polymer per minute) was blended with 0.70 g/min of the epoxide crosslinker pentaerythritol tetraglycidyl ether (corresponding to 0.19% by weight based on polymer) and with 3.71 g/min of the amine accelerator bis(2-dimethylaminoethyl)ether (corresponding to 1.0% by weight based on polymer). The epoxide was metered via a peristaltic pump at metering point 1.1, and the amine was metered separately via a peristaltic pump at metering point 1.2 (see FIG. 1). To improve meterability and the quality of mixing achievable, the crosslinker system used was diluted with the liquid dimethyl propylphosphonate Levagard® DMPP from Lanxess (ratio of the crosslinker 0.5:1). The operational parameters are summarized in Table 3. The processing life of the completed compounded formulations was more than 7 minutes with an average composition temperature of 125° C. after departure from the Leistritz twin-screw extruder. Coating took place on a 2-roll applicator in accordance with FIG. 1, at roll surface temperatures of 100° C. in each case and with a coat weight each of 100 g/m² onto 23 µm PET film. On the adhesive tapes thus produced, measurements were made of the bond strength to steel at room temperature and microshear travel at 40° C. as a function of the storage time. After 14 days of room-temperature storage, the maximum microshear travel is not significantly different. The technical adhesive data of Examples B1 to B5 are summarized in Table 4. These examples show that very high-performance adhesive tapes can be produced, featuring, among other qualities, high bond strengths to polar and apolar substrates (steel and polyethylene) and good cohesive properties even under the influence of temperature.

Comparison of the Room Temperature Kinetics of Various Accelerators (Examples B5 to B9)

The following examples were carried out in each case with the polymer P3, with the epoxide crosslinker pentaerythritol tetraglycidyl ether (Polypox® R 16 from UPPC, 0.19% by weight based on polymer) and with the resin Dertophene® T105 (from DRT, 32% by weight based on polymer). The amount of accelerator was selected such that the number of activating basic groups is constant (see Table 2). Because of the different number of functionalities per molecule, there is therefore variation in the amount-of-substance concentration, based on the polyacrylate.

The coat weight is 50 g/m² in each case onto 23 µm PET film. On the adhesive tapes produced in this way, measurements were made of the bond strength to steel at room temperature and microshear travel at 40° C. as a function of the storage time (selected examples of microshear travel are shown in FIG. 4). The technical adhesive data of Examples B5 to B9 are summarized in Table 4. Since operation was analogous to Example B3, the operational parameters are no longer explicitly listed.

TABLE 2

Accelerator concentrations

| Example | Accelerator | Concentration [%] | Amine groups/100 g polymer [mol] |
|---|---|---|---|
| B5 | bis(2-dimethylaminoethyl) ether | 0.93 | 1.2 |
| B6 | trans-2-aminocyclohexanol | 1.82 | 1.2 |
| B7 | N,N,N'-trimethyl-N'-hydroxyethyl-bisaminoethyl ether | 1.03 | 1.2 |
| Comparative Example B8 | diethylenetriamine | 0.41 | 1.2 |
| Comparative Example B9 | N,N,N,N-tetramethylmethanediamine | 0.61 | 1.2 |

When the crosslinker-accelerator system of the invention is used, the crosslinking reaction proceeds to completion via the functional groups of the polyacrylate, even without

TABLE 1

Composition-specific details

Compounding by Process 2

Substances and quantities

| Example I | Polymer base | K Value [ ] | Polymer and adjuvants | Crosslinker Accelerator | % by weight based on polymer |
|---|---|---|---|---|---|
| B1 | P1 | 79.6 | 70 parts polymer P1 + 30 parts resin DT 105 | Polypox ® R16 Jeffcat ® ZF-20 | 0.19 1.0 |
| B2 | P2 | 41.9 | 70 parts polymer P2 + 30 parts resin DT 105 | Polypox ® R20 Jeffcat ® ZF-20 | 0.19 1.0 |
| B3 | P3 | 75.1 | 70 parts polymer P3 + 30 parts resin DT 105 | Polypox ® R16 Jeffcat ® ZF-20 | 0.19 1.0 |
| B4 | P4 | 51.3 | 70 parts polymer P4 + 30 parts resin DT 105 | Polypox ® R16 Jeffcat ® ZF-20 | 0.19 1.0 |

K value = measurement method A1
DT 105 = Dertophene ® T105 supply of heat, under standard conditions (room temperature). Generally speaking, after a storage time of 7 days to 14 days, the crosslinking reaction has concluded to an extent such that an adhesive tape or carrier layer present is functional. The ultimate crosslinking state and hence the ultimate cohesion of the composition are achieved, depending on the choice of the composition/crosslinker system, after a storage time of 14 to 30 days, in advantageous form after 14 to 21 days' storage time at room temperature, expected to be earlier in the case of a higher storage temperature.

As a result of the crosslinking there is an increase in the cohesion of the adhesive and hence also in the shear strength. The linking groups obtained are very stable. This allows very aging-stable and heat-resistant self-adhesive tapes. It can be shown, moreover, that the choice of accelerator has virtually no influence on the technical adhesive properties but has a very great influence on the room-temperature kinetics (see FIG. 4 and also Table 4). Looking at Comparative Examples B8 and B9, it is apparent that within the aforementioned period of time, crosslinking is not yet concluded, and that gelling occurs in the operation beforehand unless the crosslinker-accelerator system of the invention is used.

TABLE 3

Operational parameters

| | Base polymer | | | Operational parameters | | | | | | | |
|---|---|---|---|---|---|---|---|---|---|---|---|
| Example [ ] | Polymer [ ] | K value [ ] | Compounding by Process 2 Fraction of adjuvants | Throughput total mass TSE [kg/h] | TSE speed [1/min] | Target power consumption TSE [A] | Pressure at TSE exit [bar] | Material temperature after TSE [° C.] | Doctor roll DR | Coating roll CR | Processing life [min] |
| B1 | P1 | 79.6 | 70 parts Polymer P1 + 30 parts Resin DT 105 | 32.0 | 110 | 15 | 12 | 125 | 100 | 100 | greater than 7 |
| B2 | P2 | 41.9 | 70 parts Polymer P2 + 30 parts Resin DT 105 | 32.4 | 110 | 7 | 5 | 108 | 100 | 100 | greater than 7 |
| B3 | P3 | 75.1 | 70 parts Polymer P3 + 30 parts Resin DT 105 | 32.0 | 110 | 15 | 12 | 125 | 100 | 100 | greater than 7 |
| B4 | P4 | 51.3 | 70 parts Polymer P4 + 30 parts Resin DT 105 | 33.0 | 110 | 11 | 13 | 117 | 100 | 100 | greater than 7 |

TSE = Twin screw extruder;
DT 105 = Dertophene ® T105

TABLE 4

Technical adhesive results

| | Base polymer | | | | Technical adhesive properties after specimen storage for 25 days at room temperature | | | | | |
|---|---|---|---|---|---|---|---|---|---|---|
| Example [ ] | Polymer [ ] | K value [ ] | Compounding by Process 2 Fraction of adjuvants | Carrier film [ ] | Coat weight [g/m²] | Bond strength to steel [N/cm] | Bond strength to PE [N/cm] | Holding power 10N, 23° C. [min] | Hold power 10N, 70° C. [min] | MST 40° C./ elast. fract. [µm]/[%] |
| B1 | P1 | 79.6 | 70 parts Polymer P1 + 30 parts Resin DT 105 | 23 µm PET film | 100 | 9.8 | 4.2 | >10.000 | 80 | 160/75 |
| B2 | P2 | 41.9 | 70 parts Polymer P2 + 30 parts Resin DT 105 | 23 µm PET film | 100 | 11.5 | 5.5 | 1.600 | 30 | 370/68 |
| B3 | P3 | 75.1 | 70 parts Polymer P3 + 30 parts Resin DT 105 | 23 µm PET film | 100 | 10.8 | 4.8 | >10.000 | 680 | 120/67 |
| B4 | P4 | 51.3 | 70 parts Polymer P4 + 30 parts Resin DT 105 | 23 µm PET film | 100 | 7.4 | 2.9 | >10.000 | 580 | 230/73 |
| B5 | P3 | 75.1 | 68 parts Polymer P3 + 32 parts Resin DT 105 | 23 µm PET film | 50 | 8.7 | 5.0 | 1.124 | 120 | 828/58 |
| B6 | P3 | 75.1 | 68 parts Polymer P3 + 32 parts Resin DT 105 | 23 µm PET film | 50 | 8.6 | 4.9 | 1.526 | 136 | 344/66 |
| B7 | P3 | 75.1 | 68 parts Polymer P3 + 32 parts Resin DT 105 | 23 µm PET film | 50 | 8.4 | 4.2 | 1.794 | 125 | 533/61 |
| B8 (Comp.) | P3 | 75.1 | 68 parts Polymer P3 + 32 parts Resin DT 105 | 23 µm PET film | 50 | Tests not possible, formulation has gelled | | | | — |
| B9 (Comp.) | P3 | 75.1 | 68 parts Polymer P3 + 32 parts Resin DT 105 | 23 µm PET film | 50 | Tests not possible, formulation is not crosslinked | | | | greater than 2000/0 |

Bond strength steel/PE = measurement method H1
Holding power = measurement method H2
MST = Microshear travel = measurement method H3
DT 105 = Dertophene ® T105
For the nature of the accelerator in Examples B5 to B9, see Table 2

The invention claimed is:

1. A crosslinker-accelerator system for the thermal crosslinking of polyacrylates having functional groups capable of entering into linking reactions with epoxide groups, comprising at least one substance comprising at least two epoxide groups as crosslinker and at least one substance of the formula (I)

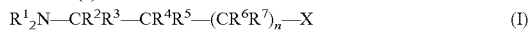

$$R^1{}_2N-CR^2R^3-CR^4R^5-(CR^6R^7)_n-X \qquad (I)$$

in which
the radicals $R^1$ independently of one another are a hydrogen atom or a substituted or unsubstituted alkyl or cycloalkyl radical having 1 to 8 carbon atoms or together with the nitrogen atom form a 5-7-membered ring which comprises at least 4 carbon atoms and not more than one further heteroatom as ring atoms; the radicals $R^2$, $R^3$, $R^4$, $R^5$, $R^6$ and $R^7$ independently of one another are a hydrogen atom or an alkyl radical having 1 to 8 carbon atoms or form a 5-7-membered cycloalkylene group;
n is an integer from 1 to 4; and
X is a group selected from the group consisting of —OH, —OR, —SH, —SR and —PR2, in which the radicals R independently of one another are a Ci-Cis alkyl radical, C2-C18 alkenyl radical or C2-C18 alkynyl radical which is in each case linear or branched and unsubstituted or substituted, or an unsubstituted or substituted aryl group or an aliphatic or aromatic heterocycle, as accelerator.

2. The crosslinker-accelerator system according to claim 1, wherein X is a group selected from the group consisting of —OH, —OR and —PR$_2$.

3. The crosslinker-accelerator system according to claim 2, wherein X is —OH or —OR.

4. The crosslinker-accelerator system according to claim 3, wherein R is an optionally substituted alkylaminoalkyl radical.

5. The crosslinker-accelerator system according to claim 1, wherein at least one of the radicals $R^1$ is a substituted or unsubstituted alkyl or cycloalkyl radical having 1 to 8 carbon atoms.

6. The crosslinker-accelerator system according to claim 5, wherein both radicals $R^1$ independently of one another are a substituted or unsubstituted alkyl or cycloalkyl radical having 1 to 8 carbon atoms.

7. The crosslinker-accelerator system according to claim 6, wherein the two radicals R1 are each a methyl group.

8. The crosslinker-accelerator system according to claim 1, wherein the ratio of the number of all the substituted and unsubstituted amino and phosphine groups in the accelerator to the number of epoxide groups in the crosslinker is from 0.2:1 to 4:1.

9. Method for the thermal crosslinking of polyacrylates having functional groups capable of entering into linking reactions with epoxide groups, comprising carrying out the thermal crosslinking with the crosslinker-accelerator according to claim 1.

10. Method for producing thermally crosslinked polyacrylates which comprises thermally crosslinking said polyacrylates with the crosslinker-accelerator of claim 1.

* * * * *

UNITED STATES PATENT AND TRADEMARK OFFICE
CERTIFICATE OF CORRECTION

PATENT NO. : 9,896,521 B2
APPLICATION NO. : 13/736476
DATED : February 20, 2018
INVENTOR(S) : Alexander Prenzel et al.

Page 1 of 1

It is certified that error appears in the above-identified patent and that said Letters Patent is hereby corrected as shown below:

In the Claims

Column 31, Line 23, "Ci Cis" should read -- $C_1$-$C_{18}$ --.

Column 32, Line 16, "R1" should read -- $R^1$ --.

Signed and Sealed this
Eighteenth Day of June, 2019

Andrei Iancu
*Director of the United States Patent and Trademark Office*